US011765444B2

(12) United States Patent
Stockhammer et al.

(10) Patent No.: US 11,765,444 B2
(45) Date of Patent: Sep. 19, 2023

(54) STREAMING MEDIA DATA INCLUDING AN ADDRESSABLE RESOURCE INDEX TRACK

(71) Applicant: QUALCOMM Incorporated, San Diego, CA (US)

(72) Inventors: Thomas Stockhammer, Bergen (DE); Imed Bouazizi, Frisco, TX (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/362,673

(22) Filed: Jun. 29, 2021

(65) Prior Publication Data

US 2022/0007086 A1 Jan. 6, 2022

Related U.S. Application Data

(60) Provisional application No. 63/047,153, filed on Jul. 1, 2020.

(51) Int. Cl.
*H04N 21/845* (2011.01)
*G06F 16/71* (2019.01)
(Continued)

(52) U.S. Cl.
CPC ......... *H04N 21/8456* (2013.01); *G06F 16/71* (2019.01); *G06F 16/745* (2019.01); *H04L 65/612* (2022.05); *H04N 21/84* (2013.01)

(58) Field of Classification Search
CPC .. H04N 21/8456; H04N 21/84; H04N 21/235; H04N 21/23614; H04N 21/4348;
(Continued)

(56) References Cited

U.S. PATENT DOCUMENTS

2016/0234536 A1 8/2016 Stockhammer et al.
2018/0288500 A1* 10/2018 Stockhammer ...... H04N 21/235
(Continued)

FOREIGN PATENT DOCUMENTS

EP          2908535 A1 *  8/2015  ......... H04N 21/2187
EP          2908535 A1    8/2015
WO      2018187318 A1   10/2018

OTHER PUBLICATIONS

AWS: "Achieving Great Video Quality without Breaking the Bank", Streaming Media, Jun. 2019, pp. 31-40.
(Continued)

*Primary Examiner* — Nnenna N Ekpo
(74) *Attorney, Agent, or Firm* — Shumaker & Sieffert, P.A.

(57) ABSTRACT

An example device for retrieving media data includes a memory configured to store media data; and one or more processors implemented in circuitry and configured to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; retrieve the determined addressable resources; and store the retrieved addressable resources in the memory.

47 Claims, 9 Drawing Sheets

(51) Int. Cl.
*H04N 21/84* (2011.01)
*G06F 16/74* (2019.01)
*H04L 65/612* (2022.01)

(58) Field of Classification Search
CPC ........... H04N 21/845; H04N 21/85406; H04N 21/23439; H04N 21/2353; H04N 21/26258; G06G 16/71; G06F 16/745; H04L 65/4084; H04L 67/02; H04L 69/22
See application file for complete search history.

(56) References Cited

U.S. PATENT DOCUMENTS

2020/0077132 A1\* 3/2020 Sivaramalingam ........................ H04N 21/4621
2020/0112753 A1 4/2020 Stockhammer et al.

OTHER PUBLICATIONS

ETSI TR 126 925: "5G; Typical Traffic Characteristics of Media Services on 3GPP Networks (3GPP TR 26.925 Version 16.0.0 Release 16)", V16.0.0 (Nov. 2020), pp. 1-34.
ETSI TS 123 502: "5G; Procedures for the 5G System (3GPP TS 23.502 Version 15.2.0 Release 15)", V15.2.0, Jun. 2018, 311 Pages.
ETSI TS 128 530: "5G; Management and Orchestration; Concepts, Use Cases and Requirements (3GPP TS 28.530 version 15.0.0 Release 15)", V15.0.0, Oct. 2018, 32 Pages.
Fielding R., et al., "Hypertext Transfer Protocol—HTTP/1.1", Network Working Group, Request for Comments, RFC 2616, Standards Track, Jun. 1999, pp. 1-114.
Fielding R., et al., "Hypertext Transfer Protocol (HTTP/1.1): Semantics and Content", RFC 7231, Standards Track, Intenet Engineering Task Force (IETF), Request for Comments: 7231, ISSN: 2070-1721, Jun. 2014, pp. 1-131.
"Information Technology—Dynamic Adaptive Streaming Over HTTP (Dash)—Part 1: Media Presentation Description and Segment Formats", ISO/IEC 23009-1, International Standard, Draft Third Edition, Jan. 9, 2017, 216 pages.
ISO/IEC 14496-12: "Information Technology—Coding of Audio-Visual Objects—Part 12: ISO Base Media File Format", 5th Edition, Dec. 15, 2015, 248 Pages.
ITU-T H.265: "Series H: Audiovisual and Multimedia Systems Infrastructure of Audiovisual Services—Coding of Moving Video High Efficiency Video Coding", The International Telecommunication Union, Jun. 2019, 696 Pages.
Manohara M., et al., "Optimized Shot-Based Encodes: Now Streaming", Mar. 9, 2018, pp. 1-21, Netflix Technology Blog, https://netflixtechblog.com/optimized-shot-based-encodes-now-streaming-4b9464204830.
Paila T., et al., "FLUTE—File Delivery Over Unidirectional Transport", FLUTE—File Delivery over Unidirectional Transport, rfc6726. txt, Internet Engineering Task Force (IETF), Standard Track, Internet Society (ISOC) 4, Rue Des Falaises CH—1205 Geneva, Switzerland, Nov. 6, 2012 (Nov. 6, 2012), XP015086468, pp. 1-46, http://tools.ietf.org/html/rfc6726, [retrieved on Nov. 6, 2012], p. 3, line 30—p. 27, line 12.
Reznik Y., "Context-Aware Encoding and 5G", Brightcove, Dash-If Workshop on Media Streaming Meets 5g, Portland, OR, Dec. 9-10, 2019, 17 Pages.
SA WG4: "Study on 5G Media Streaming Extensions", 3GPP TSG-SA Meeting #90e, SP-200937, Electronic Meeting, Dec. 8-14, 2020, 4 Pages.
International Search Report and Written Opinion—PCT/US2021/039822—ISA/EPO—dated Sep. 27, 2021, 16 pp.
Stockhammer T., "Dash and CMAF: Referencing Common Segment Formats", 117, MPEG Meeting, Jan. 16, 2017-Jan. 20, 2017, Geneva, (Motion Picture Expert Group or ISO/IEC JTC1/SC29/WG11), No. m39926, Jan. 12, 2017, XP030068271, 11 Pages, Retrieved from the Internet: URL: http://phenix.int-evry.fr/mpeg/doc_end_user/documents/117_Geneva/wg11/m39926-v1-m39926_CMAF_Referencing.zip, m39926-CMAF-Referencing.docx, [retrieved on Jan. 12, 2017], The whole document.
Stockhammer T., (QUALCOMM): "Updates to DASH Profile for CMAF Content", 128. MPEG Meeting, Oct. 7, 2019-Oct. 11, 2019, Geneva, (Motion Picture Expert Group ORISO/IEC JTC1/SC29/WG11), No. m50977, Oct. 4, 2019 (Oct. 4, 2019), XP030221481, Retrieved from the Internet: URL: http://phenix.int-evry.fr/mpeg/doc_end_user/documents/128_Geneva/wg11/m50977-v1-m50977-ProfileUpdate.zip, m50977-ProfileUpdate.docx, [retrieved on Oct. 4, 2019], The whole document.

\* cited by examiner

STREAMING MEDIA DATA INCLUDING AN ADDRESSABLE RESOURCE INDEX TRACK

This application claims the benefit of U.S. Provisional Application No. 63/047,153, filed Jul. 1, 2020, the entire contents of which are hereby incorporated by reference.

TECHNICAL FIELD

This disclosure relates to storage and transport of encoded video data.

BACKGROUND

Digital video capabilities can be incorporated into a wide range of devices, including digital televisions, digital direct broadcast systems, wireless broadcast systems, personal digital assistants (PDAs), laptop or desktop computers, digital cameras, digital recording devices, digital media players, video gaming devices, video game consoles, cellular or satellite radio telephones, video teleconferencing devices, and the like. Digital video devices implement video compression techniques, such as those described in the standards defined by MPEG-2, MPEG-4, ITU-T H.263 or ITU-T H.264/MPEG-4, Part 10, Advanced Video Coding (AVC), ITU-T H.265 (also referred to as High Efficiency Video Coding (HEVC)), and extensions of such standards, to transmit and receive digital video information more efficiently.

Video compression techniques perform spatial prediction and/or temporal prediction to reduce or remove redundancy inherent in video sequences. For block-based video coding, a video frame or slice may be partitioned into macroblocks. Each macroblock can be further partitioned. Macroblocks in an intra-coded (I) frame or slice are encoded using spatial prediction with respect to neighboring macroblocks. Macroblocks in an inter-coded (P or B) frame or slice may use spatial prediction with respect to neighboring macroblocks in the same frame or slice or temporal prediction with respect to other reference frames.

After video data has been encoded, the video data may be packetized for transmission or storage. The video data may be assembled into a video file conforming to any of a variety of standards, such as the International Organization for Standardization (ISO) base media file format and extensions thereof, such as AVC.

SUMMARY

In general, this disclosure describes techniques for streaming media data including an addressable resource index (ARI) track. Streaming media data generally includes streaming multiple files that, together, form a media presentation (e.g., a full-length movie). The files may include multiple tracks, each of which may include, e.g., video data, signaling data, hint data, or the like. An ARI track, per the techniques of this disclosure, may describe details of addressable resources and/or subsets of a common media application format (CMAF) switching set in a single index track. The addressable resources may generally be individually retrievable sets of media data, such as track files, segments, or chunks in CMAF.

In one example, a method of retrieving media data includes retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determining durations and sizes of the addressable resources from the data of the ARI track; determining one or more of the addressable resources to retrieve using the data of the ARI track including the durations and sizes of the addressable resources; and retrieving the determined addressable resources.

In another example, a device for retrieving media data includes a memory configured to store media data; and one or more processors implemented in circuitry and configured to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; retrieve the determined addressable resources; and store the retrieved addressable resources in the memory.

In another example, a computer-readable storage medium has stored thereon instructions that, when executed, cause a processor to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; and retrieve the determined addressable resources.

In another example, a device for retrieving media data includes means for retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; means for determining durations and sizes of the addressable resources from the data of the ARI track; means for determining one or more of the addressable resources to retrieve using the data of the ARI track including the durations and sizes of the addressable resources; and means for retrieving the determined addressable resources.

The details of one or more examples are set forth in the accompanying drawings and the description below. Other features, objects, and advantages will be apparent from the description and drawings, and from the claims.

DETAILED DESCRIPTION

Figure 1:
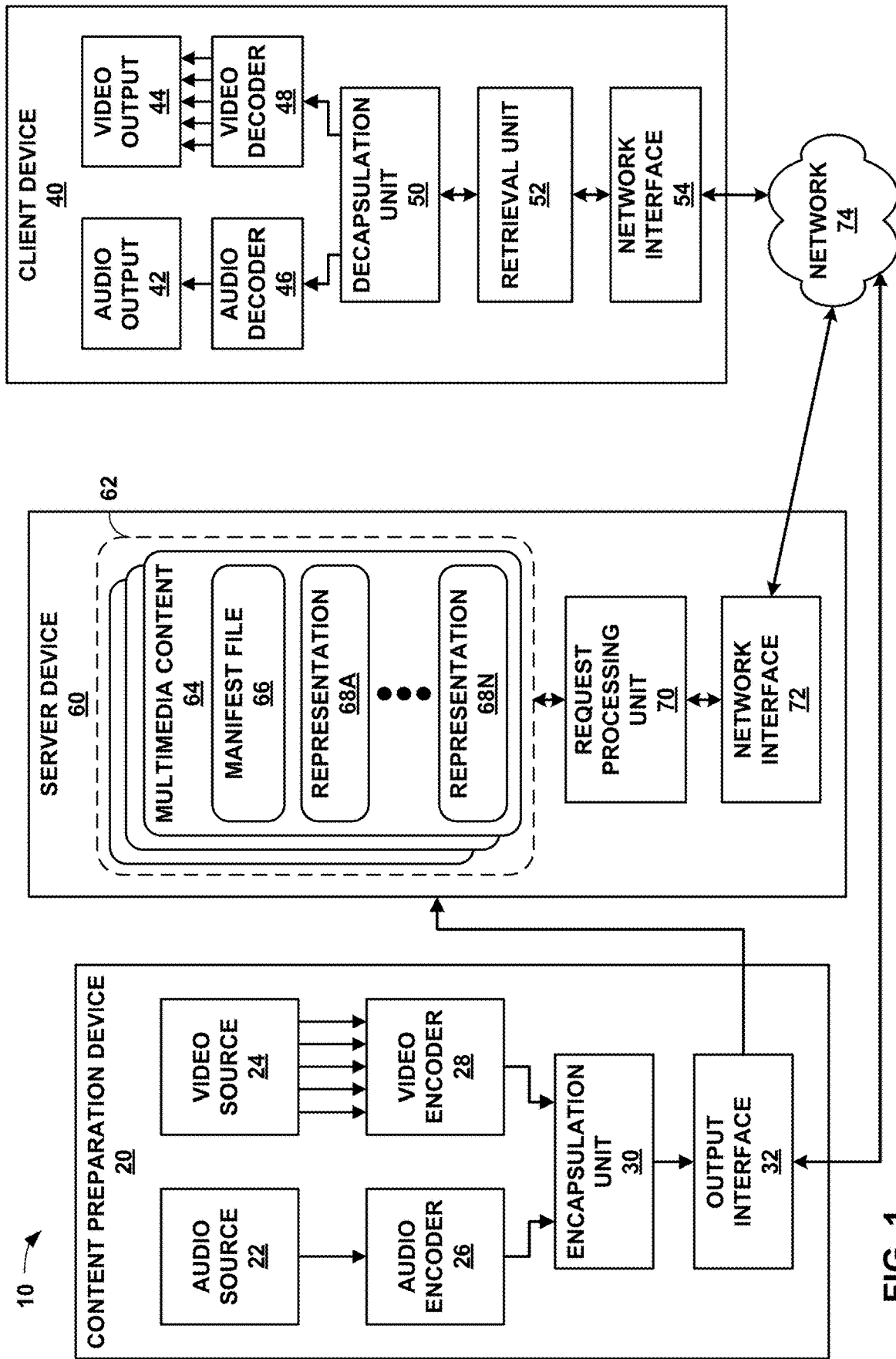
FIG. 1 is a block diagram illustrating an example system that implements techniques for streaming media data over a network.

In general, this disclosure describes techniques for streaming of media data using an addressable resource index (ARI) track. An adaptive streaming client, such as a Dynamic Adaptive Streaming over HTTP (DASH) client, may need information that exactly describes, for example, a duration and size of addressable resources and possible subsets of the addressable resources on a server device. The addressable resources may be track files, segments, or chunks in common media application format (CMAF), or other similar elements of DASH, high level streaming (HLS), or other streaming protocols and media formats.

A Segment Index (SIDX) box of a media file may provide an exact map of similar information to that discussed above for on-demand services. For live services, a minimum buffer and bandwidth pair signaling may be provided. A resynchronization (resync) index segment may be used to provide a localized Index for each segment.

This disclosure recognizes the potential benefit for creating additional information on estimated or exact bitrates (duration and size) of addressable resources for optimized client operations. Client optimizations may be different, depending on the client operation mode. For example, such operation modes may include low-latency live, live, time-shifted, video on demand (VoD), or the like. Other considerations may include a target latency for the client device, network conditions, and desired content quality.

The minimum buffer (minBuffer)/bandwidth pair signaling discussed above may reflect inaccurate bitrates that are not usable by a client device to schedule downloads. While the resync index segment is generally good, the signaled information is individual for a particular segment and representation, resulting in significant amounts of requests for obtaining all information for all segments. The SIDX box information is typically only usable for VoD, because the SIDX box information documents an entire file including the SIDX box.

The techniques of this disclosure regarding use of an ARI track may provide a more generalized and flexible approach to solving the issues of signaling duration and size of addressable resources, and other such issues.

The techniques of this disclosure may be applied to video files conforming to video data encapsulated according to any of ISO base media file format, Scalable Video Coding (SVC) file format, Advanced Video Coding (AVC) file format, Third Generation Partnership Project (3GPP) file format, and/or Multiview Video Coding (MVC) file format, or other similar video file formats.

In HTTP streaming, frequently used operations include HEAD, GET, and partial GET. The HEAD operation retrieves a header of a file associated with a given uniform resource locator (URL) or uniform resource name (URN), without retrieving a payload associated with the URL or URN. The GET operation retrieves a whole file associated with a given URL or URN. The partial GET operation receives a byte range as an input parameter and retrieves a continuous number of bytes of a file, where the number of bytes correspond to the received byte range. Thus, movie fragments may be provided for HTTP streaming because a partial GET operation can get one or more individual movie fragments. In a movie fragment, there can be several track fragments of different tracks. In HTTP streaming, a media presentation may be a structured collection of data that is accessible to the client. The client may request and download media data information to present a streaming service to a user.

In the example of streaming 3GPP data using HTTP streaming, there may be multiple representations for video and/or audio data of multimedia content. As explained below, different representations may correspond to different coding characteristics (e.g., different profiles or levels of a video coding standard), different coding standards or extensions of coding standards (such as multiview and/or scalable extensions), or different bitrates. The manifest of such representations may be defined in a Media Presentation Description (MPD) data structure. A media presentation may correspond to a structured collection of data that is accessible to an HTTP streaming client device. The HTTP streaming client device may request and download media data information to present a streaming service to a user of the client device. A media presentation may be described in the MPD data structure, which may include updates of the MPD.

A media presentation may contain a sequence of one or more Periods. Each period may extend until the start of the next Period, or until the end of the media presentation, in the case of the last period. Each period may contain one or more representations for the same media content. A representation may be one of a number of alternative encoded versions of audio, video, timed text, or other such data. The representations may differ by encoding types, e.g., by bitrate, resolution, and/or codec for video data and bitrate, language, and/or codec for audio data. The term representation may be used to refer to a section of encoded audio or video data corresponding to a particular period of the multimedia content and encoded in a particular way.

Representations of a particular period may be assigned to a group indicated by an attribute in the MPD indicative of an adaptation set to which the representations belong. Representations in the same adaptation set are generally considered alternatives to each other, in that a client device can dynamically and seamlessly switch between these representations, e.g., to perform bandwidth adaptation. For example, each representation of video data for a particular period may be assigned to the same adaptation set, such that any of the representations may be selected for decoding to present media data, such as video data or audio data, of the multimedia content for the corresponding period. The media content within one period may be represented by either one representation from group 0, if present, or the combination of at most one representation from each non-zero group, in some examples. Timing data for each representation of a period may be expressed relative to the start time of the period. In accordance with the techniques of this disclosure, as discussed in greater detail below, one or more adaptation sets may correspond to a switching set, such as a common media application format (CMAF) switching set. Similarly, each representation of the one or more adaptation sets may correspond to a CMAF track.

A representation may include one or more segments. Each representation may include an initialization segment, or each segment of a representation may be self-initializing. When present, the initialization segment may contain initialization information for accessing the representation. In general, the initialization segment does not contain media data. A segment may be uniquely referenced by an identifier, such as a uniform resource locator (URL), uniform resource name (URN), or uniform resource identifier (URI). The MPD may provide the identifiers for each segment. In some examples, the MPD may also provide byte ranges in the form of a range attribute, which may correspond to the data for a segment within a file accessible by the URL, URN, or URI.

Furthermore, each of the segments may include a respective plurality of chunks of media data. The chunks may be retrievable using, e.g., HTTP partial GET requests specifying respective byte ranges for the chunks. The chunks may be time aligned between segments of different representations. Furthermore, according to the techniques of this disclosure, the ARI track may include samples that are time-aligned with the chunks of the various segments and representations. Each sample of the ARI track may describe characteristics of the corresponding chunks, such as whether the chunks form the start of a new segment, a track identifier for a corresponding one of the representations, and for each representation, a marker signaling flag, a stream access point (SAP) type, an offset to a start of the corresponding segment, and a number of pairs for minbuffer/bandwidth predictions.

In this manner, a client device may retrieve samples of the ARI track and use the data of these samples to retrieve corresponding chunks of the various representations and segments. For example, as noted above, the client device may formulate HTTP partial GET requests to retrieve individual chunks of segments. The client device may use the data of a sample of the ARI track representing offsets to the start of a corresponding segment to determine starting an ending bytes of the segment to include in a byte range of an HTTP partial GET request to retrieve a particular chunk. That is, for the particular chunk, the client device may determine the offset to the start of the corresponding segment from the sample of the ARI track corresponding to the particular chunk as a start of the byte range and an offset for an adjacent sample of the ARI track for the same segment as an end of the byte range.

Different representations may be selected for substantially simultaneous retrieval for different types of media data. For example, a client device may select an audio representation, a video representation, and a timed text representation from which to retrieve segments. In some examples, the client device may select particular adaptation sets for performing bandwidth adaptation. That is, the client device may select an adaptation set including video representations, an adaptation set including audio representations, and/or an adaptation set including timed text. Alternatively, the client device may select adaptation sets for certain types of media (e.g., video), and directly select representations for other types of media (e.g., audio and/or timed text).

FIG. 1 is a block diagram illustrating an example system 10 that implements techniques for streaming media data over a network. In this example, system 10 includes content preparation device 20, server device 60, and client device 40. Client device 40 and server device 60 are communicatively coupled by network 74, which may comprise the Internet. In some examples, content preparation device 20 and server device 60 may also be coupled by network 74 or another network, or may be directly communicatively coupled. In some examples, content preparation device 20 and server device 60 may comprise the same device.

Content preparation device 20, in the example of FIG. 1, comprises audio source 22 and video source 24. Audio source 22 may comprise, for example, a microphone that produces electrical signals representative of captured audio data to be encoded by audio encoder 26. Alternatively, audio source 22 may comprise a storage medium storing previously recorded audio data, an audio data generator such as a computerized synthesizer, or any other source of audio data. Video source 24 may comprise a video camera that produces video data to be encoded by video encoder 28, a storage medium encoded with previously recorded video data, a video data generation unit such as a computer graphics source, or any other source of video data. Content preparation device 20 is not necessarily communicatively coupled to server device 60 in all examples, but may store multimedia content to a separate medium that is read by server device 60.

Raw audio and video data may comprise analog or digital data. Analog data may be digitized before being encoded by audio encoder 26 and/or video encoder 28. Audio source 22 may obtain audio data from a speaking participant while the speaking participant is speaking, and video source 24 may simultaneously obtain video data of the speaking participant. In other examples, audio source 22 may comprise a computer-readable storage medium comprising stored audio data, and video source 24 may comprise a computer-readable storage medium comprising stored video data. In this manner, the techniques described in this disclosure may be applied to live, streaming, real-time audio and video data or to archived, pre-recorded audio and video data.

Audio frames that correspond to video frames are generally audio frames containing audio data that was captured (or generated) by audio source 22 contemporaneously with video data captured (or generated) by video source 24 that is contained within the video frames. For example, while a speaking participant generally produces audio data by speaking, audio source 22 captures the audio data, and video source 24 captures video data of the speaking participant at the same time, that is, while audio source 22 is capturing the audio data. Hence, an audio frame may temporally correspond to one or more particular video frames. Accordingly, an audio frame corresponding to a video frame generally corresponds to a situation in which audio data and video data were captured at the same time and for which an audio frame and a video frame comprise, respectively, the audio data and the video data that was captured at the same time.

In some examples, audio encoder 26 may encode a timestamp in each encoded audio frame that represents a time at which the audio data for the encoded audio frame was recorded, and similarly, video encoder 28 may encode a timestamp in each encoded video frame that represents a time at which the video data for an encoded video frame was recorded. In such examples, an audio frame corresponding to a video frame may comprise an audio frame comprising a timestamp and a video frame comprising the same timestamp. Content preparation device 20 may include an internal clock from which audio encoder 26 and/or video encoder 28 may generate the timestamps, or that audio source 22 and video source 24 may use to associate audio and video data, respectively, with a timestamp.

In some examples, audio source 22 may send data to audio encoder 26 corresponding to a time at which audio data was recorded, and video source 24 may send data to video encoder 28 corresponding to a time at which video data was recorded. In some examples, audio encoder 26 may encode a sequence identifier in encoded audio data to indicate a relative temporal ordering of encoded audio data but without necessarily indicating an absolute time at which the audio data was recorded, and similarly, video encoder 28 may also use sequence identifiers to indicate a relative temporal ordering of encoded video data. Similarly, in some examples, a sequence identifier may be mapped or otherwise correlated with a timestamp.

Audio encoder 26 generally produces a stream of encoded audio data, while video encoder 28 produces a stream of encoded video data. Each individual stream of data (whether audio or video) may be referred to as an elementary stream. An elementary stream is a single, digitally coded (possibly compressed) component of a representation. For example, the coded video or audio part of the representation can be an elementary stream. An elementary stream may be converted into a packetized elementary stream (PES) before being encapsulated within a video file. Within the same representation, a stream ID may be used to distinguish the PES-packets belonging to one elementary stream from the other. The basic unit of data of an elementary stream is a packetized elementary stream (PES) packet. Thus, coded video data generally corresponds to elementary video streams. Similarly, audio data corresponds to one or more respective elementary streams.

Many video coding standards, such as ITU-T H.264/AVC, ITU-T H.265/High Efficiency Video Coding (HEVC), and the upcoming Versatile Video Coding (VVC) standard, define the syntax, semantics, and decoding process for error-free bitstreams, any of which conform to a certain profile or level. Video coding standards typically do not specify the encoder, but the encoder is tasked with guaranteeing that the generated bitstreams are standard-compliant for a decoder. In the context of video coding standards, a "profile" corresponds to a subset of algorithms, features, or tools and constraints that apply to them. As defined by the H.264 standard, for example, a "profile" is a subset of the entire bitstream syntax that is specified by the H.264 standard. A "level" corresponds to the limitations of the decoder resource consumption, such as, for example, decoder memory and computation, which are related to the resolution of the pictures, bit rate, and block processing rate. A profile may be signaled with a profile_idc (profile indicator) value, while a level may be signaled with a level_idc (level indicator) value.

The H.264 standard, for example, recognizes that, within the bounds imposed by the syntax of a given profile, it is still possible to require a large variation in the performance of encoders and decoders depending upon the values taken by syntax elements in the bitstream such as the specified size of the decoded pictures. The H.264 standard further recognizes that, in many applications, it is neither practical nor economical to implement a decoder capable of dealing with all hypothetical uses of the syntax within a particular profile. Accordingly, the H.264 standard defines a "level" as a specified set of constraints imposed on values of the syntax elements in the bitstream. These constraints may be simple limits on values. Alternatively, these constraints may take the form of constraints on arithmetic combinations of values (e.g., picture width multiplied by picture height multiplied by number of pictures decoded per second). The H.264 standard further provides that individual implementations may support a different level for each supported profile.

A decoder conforming to a profile ordinarily supports all the features defined in the profile. For example, as a coding feature, B-picture coding is not supported in the baseline profile of H.264/AVC but is supported in other profiles of H.264/AVC. A decoder conforming to a level should be capable of decoding any bitstream that does not require resources beyond the limitations defined in the level. Definitions of profiles and levels may be helpful for interpretability. For example, during video transmission, a pair of profile and level definitions may be negotiated and agreed for a whole transmission session. More specifically, in H.264/AVC, a level may define limitations on the number of macroblocks that need to be processed, decoded picture buffer (DPB) size, coded picture buffer (CPB) size, vertical motion vector range, maximum number of motion vectors per two consecutive MBs, and whether a B-block can have sub-macroblock partitions less than 8×8 pixels. In this manner, a decoder may determine whether the decoder is capable of properly decoding the bitstream.

In the example of FIG. 1, encapsulation unit 30 of content preparation device 20 receives elementary streams comprising coded video data from video encoder 28 and elementary streams comprising coded audio data from audio encoder 26. In some examples, video encoder 28 and audio encoder 26 may each include packetizers for forming PES packets from encoded data. In other examples, video encoder 28 and audio encoder 26 may each interface with respective packetizers for forming PES packets from encoded data. In still other examples, encapsulation unit 30 may include packetizers for forming PES packets from encoded audio and video data.

Video encoder 28 may encode video data of multimedia content in a variety of ways, to produce different representations of the multimedia content at various bitrates and with various characteristics, such as pixel resolutions, frame rates, conformance to various coding standards, conformance to various profiles and/or levels of profiles for various coding standards, representations having one or multiple views (e.g., for two-dimensional or three-dimensional playback), or other such characteristics. A representation, as used in this disclosure, may comprise one of audio data, video data, text data (e.g., for closed captions), or other such data. The representation may include an elementary stream, such as an audio elementary stream or a video elementary stream. Each PES packet may include a stream_id that identifies the elementary stream to which the PES packet belongs. Encapsulation unit 30 is responsible for assembling elementary streams into video files (e.g., segments) of various representations.

Encapsulation unit 30 receives PES packets for elementary streams of a representation from audio encoder 26 and video encoder 28 and forms corresponding network abstraction layer (NAL) units from the PES packets. Coded video segments may be organized into NAL units, which provide a "network-friendly" video representation addressing applications such as video telephony, storage, broadcast, or streaming. NAL units can be categorized to Video Coding Layer (VCL) NAL units and non-VCL NAL units. VCL units may contain the core compression engine and may include block, macroblock, and/or slice level data. Other NAL units may be non-VCL NAL units. In some examples, a coded picture in one time instance, normally presented as a primary coded picture, may be contained in an access unit, which may include one or more NAL units.

Non-VCL NAL units may include parameter set NAL units and SEI NAL units, among others. Parameter sets may contain sequence-level header information (in sequence parameter sets (SPS)) and the infrequently changing picture-level header information (in picture parameter sets (PPS)). With parameter sets (e.g., PPS and SPS), infrequently changing information need not to be repeated for each sequence or picture; hence, coding efficiency may be improved. Furthermore, the use of parameter sets may enable out-of-band transmission of the important header information, avoiding the need for redundant transmissions for error resilience. In out-of-band transmission examples, parameter set NAL units may be transmitted on a different channel than other NAL units, such as SEI NAL units.

Supplemental Enhancement Information (SEI) may contain information that is not necessary for decoding the coded pictures samples from VCL NAL units, but may assist in processes related to decoding, display, error resilience, and other purposes. SEI messages may be contained in non-VCL NAL units. SEI messages are the normative part of some standard specifications, and thus are not always mandatory for standard compliant decoder implementation. SEI messages may be sequence level SEI messages or picture level SEI messages. Some sequence level information may be contained in SEI messages, such as scalability information SEI messages in the example of SVC and view scalability information SEI messages in MVC. These example SEI messages may convey information on, e.g., extraction of operation points and characteristics of the operation points. In addition, encapsulation unit 30 may form a manifest file, such as a media presentation descriptor (MPD) that describes characteristics of the representations. Encapsulation unit 30 may format the MPD according to extensible markup language (XML).

Encapsulation unit 30 may provide data for one or more representations of multimedia content, along with the manifest file (e.g., the MPD) to output interface 32. Output interface 32 may comprise a network interface or an interface for writing to a storage medium, such as a universal serial bus (USB) interface, a CD or DVD writer or burner, an interface to magnetic or flash storage media, or other interfaces for storing or transmitting media data. Encapsulation unit 30 may provide data of each of the representations of multimedia content to output interface 32, which may send the data to server device 60 via network transmission or storage media. In the example of FIG. 1, server device 60 includes storage medium 62 that stores various multimedia contents 64, each including a respective manifest file 66 and one or more representations 68A-68N (representations 68). In some examples, output interface 32 may also send data directly to network 74.

In some examples, representations 68 may be separated into adaptation sets. That is, various subsets of representations 68 may include respective common sets of characteristics, such as codec, profile and level, resolution, number of views, file format for segments, text type information that may identify a language or other characteristics of text to be displayed with the representation and/or audio data to be decoded and presented, e.g., by speakers, camera angle information that may describe a camera angle or real-world camera perspective of a scene for representations in the adaptation set, rating information that describes content suitability for particular audiences, or the like.

Manifest file 66 may include data indicative of the subsets of representations 68 corresponding to particular adaptation sets, as well as common characteristics for the adaptation sets. Manifest file 66 may also include data representative of individual characteristics, such as bitrates, for individual representations of adaptation sets. In this manner, an adaptation set may provide for simplified network bandwidth adaptation. Representations in an adaptation set may be indicated using child elements of an adaptation set element of manifest file 66.

Encapsulation unit 30 may further, according to the techniques of this disclosure, signal an addressable resource index (ARI) track in media files including media data. The ARI track may describe all details of addressable resources and subsets of a common media application format (CMAF) Switching Set in a single Index track. These techniques may be premised upon the assumption that a CMAF Switching Set with the same (i.e., common) Segment, Fragment, and Chunk structure as for all Tracks exists, and that encapsulation unit 30 may assign a single ARI track for the CMAF Switching Set. Encapsulation unit 30 may be configured to apply certain principles. For example, encapsulation unit 30 may time-align the ARI track with the CMAF Switching Set. Encapsulation unit 30 may construct the ARI track to document the properties of all tracks of the CMAF Switching Set. Encapsulation unit 30 may define header information for a metadata track. Encapsulation unit 30 may define a sample of the ARI track for each CMAF chunk in a time-aligned manner, such that the sample contains detailed information for each sample of the CMAF chunk.

Segmentation of the ARI track may be independent of the segment structure. For example, client device 40 may issue a single HTTP request to retrieve the ARI track, and a service performed by server device 60 may provide updates based on HTTP chunking. Random access is not necessarily relevant, as every sample may be a sync sample. Movie fragments may be used. The header information of the ARI track discussed above may include a number of tracks, a switching set identifier, a timescale identical to that of the switching set track, and additional information.

Encapsulation unit 30 may form the ARI track to include samples that are time-aligned with chunks of segments of representations. Each sample may include a CMAF track identifier, a segment boundary flag (indicating whether the chunks correspond to the start of a new segment), and for each CMAF track id in the Switching Set (e.g., one or more adaptation sets including one or more representations, where each representation may correspond to a CMAF media track), a marker signaling flag, a stream access point (SAP) type (e.g., SAP_type) value, an offset to the start of the segment, and a number of pairs for minBuffer/bandwidth predictions, for each sample or chunk at decode time t.

The techniques of this disclosure may be applied in a use case involving live mode streaming with a 6 to 8 second latency. In this use case, one adaptation set may have several representations, each having a capped variable bitrate (VBR). The bitrate may generally define the content quality. Video encoder 28 may encode data representing the capped VBR as a parameter in hypothetical reference decoder (HRD) information of a video bitstream (e.g., in a sequence parameter set (SPS)). Encapsulation unit 30 may further document the capped VBR in manifest file 66 (e.g., a DASH MPD) using a minBufferTime/bandwidth pair.

According to these techniques, client device 40 may properly handle segments with peak values significantly larger than average values. In particular, client device 40 may be configured to stick with the bitstream having the capped VBR even while retrieving segments or chunks having the capped peaks and passing such segments or chunks through an access pipeline. If access network bandwidth changes, client device 40 may switch to a relevant representation (e.g., one of representations 68) having the new capped VBR parameters.

This approach may avoid stalling, cause client device 40 to retrieve consistently good quality media data, optimize network bandwidth usage, and may be directly applicable to the DASH MPD (or other manifest files). In general, service providers want client devices to pick a representation of a particular quality and use switching only for service continuity. Continuous switching for filling the delivery pipeline may have negative repercussions. Fine grain switches to fill the access bandwidth may overly consume processing resources and overly tax available network bandwidth. Filling the access pipeline with the highest possible bitrate representation at all times may waste bits.

Conventional client devices may operate in various ways. For example, a conventional client device may switch to a different operational mode for certain content (e.g., time-shifted consumption, live to VoD conversion, or the like). In this case, the latency target may get larger, but the capped VBR may stay the same, so the new operational mode may not actually change operation, in effect. Alternatively, the conventional client device may operate on a highly fluctuating network. However, signaling data may not be capable of addressing highly fluctuating networks.

It has been asserted that multiple minBufferTime/bandwidth pairs are needed and that per segment size signaling is needed. However, generation and client use of this data has been questioned. Based on these assertions and questions, the techniques of this disclosure may be used to address how multiple minBuffer/bandwidth pairs may be mapped to an encoding parameter, e.g., whether it is possible to run an encoder that produces output with meaningful multiple minBuffer/bandwidth pairs, that is, whether multiple such pairs provide more information than a single minBuffer/bandwidth pair. These techniques may also be used to address, if segment size and duration are signaled for each segment in live streaming, whether client device 40 has adequate information to switch representations (e.g., between representations 68) and handle segments with peak values significantly larger than the average bandwidth of a selected one of representations 68.

The following aspects are relevant considerations in view of the above. Currently, video encoders do not signal multiple HRD parameters including multiple minBuffer/bandwidth values. In FFMPEG, for example, there are three parameters:

--bitrate<integer>: Enables single-pass ABR rate control. Specify the target bitrate in kbps.

--vbv-bufsize<integer>: Specify the size of the VBV buffer (kbits). Enables VBV in ABR mode. In CRF mode, --vbv-maxrate must also be specified.

--vbv-maxrate<integer>
Maximum local bitrate (kbits/sec). Will be used only if vbv-bufsize is also non-zero. Both vbv-bufsize and vbv-maxrate are required to enable VBV in CRF mode. Default 0 (disabled)

Note that when VBV is enabled (with a valid --vbv-bufsize), VBV emergency denoising is turned on. This will turn on aggressive denoising at the frame level when frame QP>QP_MAX_SPEC (51), drastically reducing bitrate and allowing ratecontrol to assign lower QPs for the following frames. The visual effect is blurring, but removes significant blocking/displacement artifacts.

VBV (video buffer verifier) may directly respond to HRD parameters, but no setting of multiple HRDs is possible. What is missing is how to set a VBV parameter.

Bitrate also is not clearly defined in terms of window size and conformance. It is likely completely unusable for a live service. A live service needs to run CRF plus VBV parameters. This would be a refinement of the reference scenario to run an encoding for each representation with three parameter settings:

vbv-maxrate: set to the maximum desired bitrate and the @bandwidth value.

vbv-bufsize: adjusted number of bits according to @minBufferTime multiplied with vbv-maxrate CRF-parameter: a reasonable CRY-parameter for the content setting. Note that this CRY parameter is not signaled (except by possibly quality ranking) and may be done so.

Well-defined encoder settings and resulting conformance aspects are important. It may be possible to define more than VBV parameters having well-defined semantics. Subsequent reporting of segment sizes may be beneficial, but is not important for operation at a live edge of streaming, as client device 40 may not have access to this information. Hence, use of this information by client device 40 and in what operation mode may be defined. Furthermore, there is no agreed conformance on parameters other than the VBV parameter for live operation.

In DASH, as one example, there are several tools for signaling bandwidth information. Manifest file 60 may be realized as an MPD including data signaling minBuffer and bandwidth values for representations 68. That is, the DASH MPD may include a pair of values for a bandwidth and buffering description, namely, the Minimum Buffer Time (MBT) expressed by the value of MPD@minBufferTime and bandwidth (BW) expressed by the value of Representation@bandwidth. The following holds:

The value of the minimum buffer time does not provide any instructions to the client on how long to buffer the media. The value however describes how much buffer a client should have under ideal network conditions. As such, MBT is not describing the burstiness or jitter in the network; it is describing the burstiness or jitter in the content encoding. Together with the BW value, it is a property of the content. Using the "leaky bucket" model, it is the size of the bucket that makes BW true, given the way the content is encoded.

The minimum buffer time provides information that for each representation, the following shall be true: if the Representation (starting at any segment) is delivered over a constant bitrate channel with bitrate equal to value of the BW attribute then each access unit with presentation time PT is available at the client latest at time with a delay of at most PT+MBT.

In the absence of any other guidance, the MBT should be set to the maximum GOP size (coded video sequence) of the content, which quite often is identical to the maximum segment duration for the live profile or the maximum subsegment duration for the On-Demand profile. The MBT may be set to a smaller value than maximum (sub)segment duration but should not be set to a higher value.

In DASH-IF IOP, the following additional information is provided:

In a simple and straightforward implementation, a DASH client decides downloading the next segment based on the following status information:
- the currently available buffer in the media pipeline, buffer
- the currently estimated download rate, rate
- the value of the attribute @minBufferTime, MBT
- the set of values of the @bandwidth attribute for each Representation i, BW[i]

The task of the client is to select a suitable Representation i.

The relevant issue is that starting from a SAP on, the DASH client can continue to playout the data. This means that at the current time it does have buffer data in the buffer. Based on this model the client can download a Representation i for which BW[i]≤rate*buffer/MBT without emptying the buffer.

Note that in this model, some idealizations typically do not hold in practice, such as constant bitrate channel, progressive download and playout of Segments, no blocking and congestion of other HTTP requests, etc. Therefore, a DASH client should use these values with care to compensate such practical circumstances; especially variations in download speed, latency, jitter, scheduling of requests of media components, as well as to address other practical circumstances.

One example is if the DASH client operates on Segment granularity. As in this case, not only parts of the Segment (i.e., MBT) needs to be downloaded, but the entire Segment, and if the MBT is smaller than the Segment duration, then rather the segment duration needs to be used instead of the MBT for the required buffer size and the download scheduling, i.e., download a Representation i for which BW[i]≤rate*buffer/max_segment_duration.

In DASH-IF IOP v5 draft, details on subsegment information and Segment Index (SIDX) are provided. Subsegment Information relevant parameters in the MPD are documented in Table 6 of DASH-IF IOP v6, reproduced below. These parameters are contained in one or more BaseURL as well as one SegmentBase element as defined in clause 5.3.9.4 of ISO/IEC 23009-1.

TABLE 6

Subsegment Information

| Element or Attribute Name | Use | Description |
| --- | --- | --- |
| BaseURL | M4 (one or more) | Includes the media Segment URL |
| SegmentBase | M4 (exactly one) | See clause 5.3.9.4 of ISO/IEC 23009-1 |
| @timescale | M4 | See Clause 5.3.9.2.2, Table 15 of ISO/IEC 23009-1 |
| @presentationTimeOffset | OD4 0 | See Clause 5.3.9.2.2, Table 15 of ISO/IEC 23009-1 |
| @eptDelta | OD4 0 | See Clause 5.3.9.2.2, Table 15 of ISO/IEC 23009-1 |
| @presentationDuration | O4 | See Clause 5.3.9.2.2, Table 15 of ISO/IEC 23009-1 |
| @indexRange | M4 | See Clause 5.3.9.2.2, Table 15 of ISO/IEC 23009-1 |

The SegmentBase element is sufficient to describe the Subsegment Information and the Media Segment URL is included in the BaseURL element. The option is referred to as option 4 in terms of addressing mode. This Subsegment Information is provided in a single Segment Index box describing all Subsegments (i.e., movie fragments) in the Representations. In order to address complexity and interoperability concerns, DASH-IF IOP restricts the On-Demand profile to a single Segment Index box.

Table 6 also expresses which of the elements is mandatorily present (M), optionally present (O) or optionally present. The default value is also provided. For example, M4 means that the attribute/element is mandatorily present for option 4.

All other elements that are not documented in Table 6 are either introduced elsewhere in the specification or are not expected to be present, and if present, are expected to be ignored by clients.

Based on the information in the MPD according to Table 6, a list of Subsegments contained in a Representation in a Period i with Period duration PD[i] can be computed. Based on the above information, for each Representation r in a Period i, the following information may be derived:
- the total number of subsegments in the Period, N[i,r],
- MPD start time of each media segment MST[k, i, r], k=1, . . . , N[i,r] relative to the Period start,
- MPD based segment duration of each media segment MSD[k, i, r], k=1, . . . , N[i,r],
- The URL of each of the subsegments, URL[k, i, r], i.e., URLByteRange(BaseURL, first, last) as defined in clause 6.4.3.3.

The used MPD information as well as the result for this is documented in the following. A single segment index is provided and, using the syntax according to ISO/JEC 14496-12:

```
aligned(8) class SegmentIndexBox extends FullBox('sidx', version, 0) {
    unsigned int(32) reference_ID;
    unsigned int(32) timescale;
    if (version==0) {
        unsigned int(32) earliest_presentation_time;
        unsigned int(32) first_offset;
    }
    else {
        unsigned int(64) earliest_presentation_time;
        unsigned int(64) first_offset;
    }
    unsigned int(16) reserved = 0;
    unsigned int(16) reference_count;
    for(i=1; i <= reference_count; i++) {
        bit (1)              reference_type;
        unsigned int(31)     referenced_size;
        unsigned int(32)     subsegment_duration;
        bit(1)               starts_with_SAP;
        unsigned int(3)      SAP_type;
        unsigned int(28)     SAP_delta_time;
    }
}
```

Let the following be defined:
- ts[i,r] be the value of the timescale field and being identical to the value of the @timescale attribute
- e[i,r] be the value of @eptDelta attribute
- o[i,r] be the value of @presentationTimeOffset attribute
- pd[i,r] be the value of @presentationDuration attribute, if present, otherwise it is PD[i]*ts
- rc be the value of the reference_count field
- pt be the value of the earliest_presentation time field
- os be the value of the first_offset field
- d[j] be the value of the subsegment_duration field for the $j^{th}$ entry with j=1, . . . rc
- b[j] be the value of the referenced_size field for the $j^{th}$ entry with j=1, . . . rc Then client device 40 may derive the Segment Information for each segment k=1, . . . , N[i,r] as follows:

- j=1
- while (pt + d[j] < o[i,r]) /* find the first subsegment */
  - pt = pt + d[j]
  - os = os + b[j]
  - j++
- k=1
- e[i,r] =pt − o[i,r] /* overlap at start − negative or 0 */
- while (pt + d[j] − o[i,r] < PD[i]*ts[i,r]) /* find the last subsegment */
  - MST[k,i,r] = (pt − o[i,r])/ts[i,r]
  - MSD[k,i,r] = d[j]/ts[i,r]
  - URL[k,i,r] = URLByteRange (BaseURL, os, os+b[j]−1)
  - pt = pt + d[j]
  - os = os + b[j]
  - j++
  - k++
- pd[i,r] = pt
- N[i,r] = k Server device 60 may receive and process, and client device 40 may send, byte range requests to exchange media data in the byte range. The URLByteRange(URL, first, last) call is mapped to the partial HTTP request with byte ranges as follows.

| URL | The URL of the HTTP Request. |
| --- | --- |
| first | The value is mapped to the value of 'first-byte-pos' of 'byte-range-spec' of IETF RFC 7231:2014, 2.1, |
| Last | The value is mapped to the value of 'last-byte-pos' of 'byte-range-spec' of IETF RFC 7231:2014, 2.1, |

For a Media Presentation following the DASH-IF core profiles, the following requirements and recommendations hold with respect to Subsegment Information:

Exactly one Segment Index shall be present with the values set as follows:
  the reference_ID shall be set to the track_TD of the Segment.
  the timescale shall be set to the timescale field of the Media Header Box of the track.
  the earliest_presentation_time shall be set to 0.
  reference_type shall all be set to 0, as reference are only to the movie fragment header box.
  SAP_delta_time shall be set to 0
If the value of e[i,r] is not 0, then @eptDelta should be present and if present, it shall be set to the value of e[i,r] as defined in clause 6.4.3.4.
If the value of (pd[i,r]−o[i,r])−PD[i]*ts[i,r] is not 0, then @presentationDuration should be present and, if present, it shall be set to the value of pd[i,r] as defined in clause 6.4.3.4.

For a DASH-IF Client that supports DASH-IF Media Presentation, the following requirements and recommendations apply with respect to Subsegment Information:

The client shall support a service offering according to the requirements in clause 6.4.3.4. Specifically, this includes:
  Downloading the index range including the CMAF header and the Segment Index using URLByteRange (URL, first, last)
  Downloading the Download sidx as byte range
  Downloading subsegments a byte range
Given a client supporting the live profile, the above requirements can be implemented as follows:

The client already issues requests for the moov box—these need to be extended to cover the Segment Index (sidx) as well.

Parse the Segment Index (<150 LoC in Javascript, open source, DASH-IF reference client) with the output being a list of (URL, byte range) pairs that would replace the usual list of URLs in the live profile.

Create list of requests (URL, byte range) pairs, instead of a list of URLs.

Only movie fragments are referenced. Therefore, the entire switching timeline of Representation can be built by downloading the SIDX first. However, a smart client may choose to download only the beginning of the Representation's SIDX box for a fast start up, then download the rest after it starts streaming the initial media subsegments.

Client device 40 may also determine its request size independent of the segment duration.

By parsing the SIDX for every Representation of interest, client device 40 can create a full subsegment map.

In the DASH context, in typical cases, Segments are treated as a single unit for download, random access to Media Presentations, and they also addressed by a single URL. However, Segments may have internal structures that enable resynchronization on a container level and random access to the respective Representation even within a Segment. The resynchronization mechanism is supported and signaled by the Resync element.

The Resync element signals Resynchronization Points in Segments. A Resynchronization Point marks the start (in byte position) of a well-structured continuous byte range within a Segment that contains media data of certain presentation duration and can be accessed independently on container format level. A Resynchronization Point may provide additional functionalities, such as access on decryption and decoding level.

A container format making use of the Resynchronization feature must define a Resynchronization Point and associated properties.

A Resynchronization Point in a Segment may be defined as follows:
  1. A Resynchronization Point enables starting parsing and processing on the container level.
  2. A Resync Point has assigned the following properties:
    a. It has a byte offset or index Index from the start of the Segment, pointing to the Resynchronization Point.
    b. It has an earliest presentation time Time in the Representation, i.e., the smallest presentation time of any sample included in the Representation when starting processing from the Resynchronization Pointer.
    c. It has assigned a type Type, for example, defined by the SAP type in ISO/IEC 14496-12.
    d. It has assigned a boolean marker property Marker whether the Resynchronization Point can be detected while parsing Segment through a specific structure or if the resync point needs to be signaled by external means.
  3. Start processing the Segment from a Resynchronization Point, together with the information in the Initialization Segment, if present, allows container parsing. Whether and how to access the contained and potentially encrypted elementary stream may be indicated by the resynchronization access point type.

Signaling each Resynchronization Point with all properties in the MPD can be done by providing a side-car Segment describing the Resynchronization Points in a Segment. However, not in all cases such side-car Segments may be provided, or at least not provided in time may be difficult, for example in case of dynamic and live services, as Resynchronization Points are added by the Segment Packager independent of MPD updates. A Resynchronization Point may be generated by the encoder and packager independent of the MPD. Also, in low-latency cases, the MPD signaling may not be available to the DASH client.

Hence, there are two non-mutually exclusive ways specified to signal Resync Points provided in a Segment in an MPD:
1. By providing a binary map for each Resynchronization Point in a Resynchronization Index Segment for each Media Segment. This is most easily used for Segments that are fully available on the network.
2. By signaling the existence of Resynchronization Points in a Media Segment with additional information that permits to easily locate the Resync in terms of the byte position and the presentation time, as well as providing the type of the Resynchronization Point.

In case the Resync element is present with @dImin and @dT attributes included and the adjusted values dImin in bytes and dT in seconds, respectively, and the @availabilityTimeComplete attribute set to false, then following shall hold:
At the adjusted availability start time of the Segment, the first chunk is available.
At the sum of the adjusted availability start time of the Segment and i*dT, the (i+1)st chunk is available with i=1, . . . , N and N the total amount of chunks in the Segment.
If the @rangeAccess attribute is set to true, available chunks may be accessed with byte ranges. If set to false, the client cannot expect that a response to a request of available byte ranges results in valid data.

When writing the DASH standard, requesting available byte ranges of partially available Segment, i.e., Segments still being produced, is not consistently supported in CDNs, but efforts are planned to provide a consistent behavior. Hence, before permitting byte range access to available parts of partially available Segments by setting the @rangeAccess attribute to true, a content provider is encouraged to check the capabilities of the CDN on which the service is deployed.

In order to signal the above properties, a Resync element is defined with different attributes, that are explained in more detail in clause 5.3.12.2, Table X. The XML Syntax is provided in clause 5.3.12.3.

The techniques of this disclosure may be used to address various use cases. In accordance with the techniques of this disclosure, content preparation device 20, server device 60, and client device 40 may be configured to perform the following.

The techniques of this disclosure may be used to improve signaling for encoding parameters. Such parameters may include the following:
1. A mapping from VBV parameters to @minBufferTime and @bandwidth.
2. A signal that the content if CRF(VBR) encoded with VBV parameters and specifying the quality of the signal.
3. Provide guidelines on how to generate content and how to signal this.
4. Possibly provide instructions to the client to pick a Representation based on a VBV and stick with this, regardless if content bitrate fluctuates.
5. Possibly permit that encoder vendors signal exactly their encoding parameters, but we would like to avoid this.
6. We do not need multiple bandwidth/minBufferTime as for live encoders, there is no way to control the encoders to do so.

For per segment size signaling:
1. First, the question from above needs to still be answered. How does the reference model change to need to signal the per segment size? How does a player use this information?
2. We have the Segment Index, which only holds for entire track files. If we need an extension, we can create a Segment Index, that is also usable for Segments. But this can only be added, once a Period is complete. Adding a Period once in a while is ok.
3. We have the Resync Index, which can create a size signaling for every segment.
4. If we need anything in between Segment Index and Resync Index, let's be very clear, what we need and why we need it.

This disclosure describes techniques that may address the above considerations. For an improved signaling of encoding parameters, in addition to the VBV parameters @minBufferTime and @bandwidth, encapsulation unit 30 may add to each of representations 68 as an option:
A signal that the content is capped VBR encoded with VBV parameters for caps
Additionally a flag for VBR with the following parameters
Window size
Target Bitrate
Maximum percentage of overshoot of the target bitrate in the window size.
The constant quality parameter, if applicable.

Issues concerning the addressable resource index (ARI) track are summarized as follows:
In several cases there is a desire that an Adaptive Streaming client has information on the duration and size of addressable resources and possible a sub-set of those on the server
Addressable Resources include Track Files, Segments or Chunks in the CMAF context, but apply equally to DASH or HLS.
For On-Demand Services, an exact map of this information is provided by the Segment Index.
In general, and in particular for Live Services, minBuffer and bandwidth signaling.
Resync allows use of the Resync Index Segment to provide a localized Index for each Segment.

Even if these options exist, it would be beneficial to create additional information on estimated or exact bitrates (duration and size) of addressable resources for optimized client operations. Client optimizations may be different depending on the client operation mode, for example:
Operation mode: low-latency live, live, time-shifted, VoD
Target latency of the client
Network conditions
Desired content quality
However, there are some issues on the existing solutions:
minBuffer/bandwidth: does only provide inaccurate bitrates not usable client download scheduling.
Resync: is generally good, but all information is individual for each Segment and Representation, resulting in a significant number of requests to get all information.

Segment Index is typically only usable for VoD, because the Segment Index documents the entire file.

The techniques of this disclosure relating to the use of the ARI track may provide a more generalized and flexible approach to these issues.

The Addressable Resource Index (ARI) Track describes all details of the Addressable resources and subsets of a CMAF Switching Set in a single Index track. These techniques are premised upon the assumption that a CMAF Switching Set with the same (i.e., common) Segment, Fragment, and Chunk Structure as for all Tracks exists and gets assigned a single ARI Track. The following principles may be applied:

The ARI Track is time-aligned with the CMAF Switching Set.

The ARI Track documents the properties of all tracks of the CMAF Switching Set.

A Header information is defined for the metadata track.

A sample of the track is defined for each CMAF chunk in a time-aligned manner.

The sample contains detailed information for each sample.

Delivery and Segmentation of the track may be independent of the Chunk/Segment Structure of the associated switching set. For example, this may be realized by issuing a single HTTP request and the service just provides updates based on HTTP Chunking. Random access is not necessarily relevant, as every sample may be a sync sample. But in this case, movie fragments need to be used.

The CMAF Addressable Resource Index (ARI) may be defined as follows:

Sample Entry Type: 'cari'
Container: Sample Description Box ('stsd')
Mandatory: No
Quantity: 0 or 1

This metadata describes all details in of the addressable resources and subsets of a CMAF Switching Set as defined in ISO/IEC 23000-19 in a single Index track.

It is assumed that for all for all Tracks in the CMAF Switching Sets the same Segment, Fragment, and Chunk structure applies.

The following principles are applied:
The ARI Track is time-aligned with the tracks of the CMAF Switching Set.
The ARI Track documents the properties of all tracks of the CMAF Switching Set.
A Header information is defined for the metadata track.
A sample of the track is defined for each CMAF chunk in a time-aligned manner. The association of the chunk and the metadata sample is done such that the baseMediaDecodeTime of the chunk is identical to the sample time in the metadata track.
The sample contains detailed information for each sample.

This track may even be used to carry for example Events or Producer Reference time.

Syntax for the CMAF ARI metadata may be defined as follows for a sample entry:

```
class CmafAriMetaDataSampleEntry( )
        extends MetaDataSampleEntry ('cari') {
    CmafAriConfigurationBox( );
}
aligned(8) class CmafAriConfigurationBox
    extends FullBox('cari', version = 0, flags = 0) {
    unsigned int(32) switching_set_identifier;
```

-continued

```
    unsigned int(16) num_tracks;
    bit (1)           quality_indicator_flag;
    for(i=1; i <= num_tracks; i++)                {
        unsigned int(32) track_id;
        // provides the order of the tracks for each sample
    }
// additional information on the CMAF Switching Set may be provided
        if (quality_indicator_flag)                {
            string quality_identifier;
        }
}
```

CMAF Addressable Resource Index samples may use the following syntax:

```
class CmafAriFormatStruct ( ) {
    // this information may also be provided per track
    boolean(1)              segment_start_flag;
    bit (1)                 marker;
    bit(1)                  starts_with_SAP;
    unsigned int(3)         SAP_type;
    bit(1)                  emsg_flag;
    bit(1)                  prft_flag;
    unsigned int(24)        reserved;
    // this information may also be provided per track
    for(i=1; i <= num_tracks; i++)            {
        unsigned int(32) first_offset
        unsigned int(32) size;
        unsigned int(16) quality;
        bit(1) loss;
        unsigned int(15) reserved;
        unsigned int(8) num_prediction_pairs;
        for(i=1; i <= prediction_pairs; i++) {
            unsigned int(32)          prediction_min_window;
            unsigned int(32)          predicted_max_bitrate;
        }
    }
}
```

Semantics for the syntax above may be defined as follows:

switching_set_identifier a unique identifier for the switching set in the context of the application.

num_tracks the number of tracks in the switching set.

track ID provides the ordering of the track_IDs in the samples.

quality_indicator_flag identifies if a specific quality indicator is used for identifying the quality of the chunk.

quality identifier an identifier that tells how the quality values in the sample are expected to be interpreted.

segment start flag identifies if this chunk is identical with the start of a segment, i.e., if the chunk is the start of a segment.

starts_with_SAP identifies if this chunk starts with a SAP.

SAP_type if starts_with_SAP is set, identifies the SAP_type.

marker identifies if this chunk includes a marker including the styp emsg_flag identifies if this chunk provides emsg boxes.

prft_flag identifies if this chunk includes prft boxes.

first_offset identifies the offset of the chunk from the start of the sequence size provides the size in octets of the chunk.

quality provides the quality of the chunk according to quality scheme. If quality scheme is absent, then quality is interpreted linearly with quality increase with increasing value.

Loss identifies that the data is lost num_prediction_pairs provides how many prediction pairs for the expected bitrate are provided.

prediction_min_windows provides a value for minbuffer time identical to the MPD value.

predicted_max_bitrate provides a value for bandwidth time identical to the MPD semantics that holds for the duration of the prediction_min_windows value.

Encapsulation unit 30 may construct manifest file 66 (e.g., a DASH MPD) to include data related to the following:

1. The metadata track is provided as a regular adaptation Set with a single track
2. A Switching Set is associated with this track
3. The streaming is done as regular, but any optimizations can be done:
   a. Availability time offset
   b. Chunking
   c. Segmentation Client device 40 may access the metadata track ahead, or at least together with, segment availability times. A DASH client of client device 40 may implement a metadata processor of the ARI track and make use of the information. This may simplify the overall addition, as all existing streaming technologies can be applied.

If the ARI track metadata is provided, then resync may only be used to signal chunking promises, but the resync index segment functionality can be removed. More optimization may be done.

Server device 60 includes request processing unit 70 and network interface 72. In some examples, server device 60 may include a plurality of network interfaces. Furthermore, any or all of the features of server device 60 may be implemented on other devices of a content delivery network, such as routers, bridges, proxy devices, switches, or other devices. In some examples, intermediate devices of a content delivery network may cache data of multimedia content 64, and include components that conform substantially to those of server device 60. In general, network interface 72 is configured to send and receive data via network 74.

Request processing unit 70 is configured to receive network requests from client devices, such as client device 40, for data of storage medium 62. For example, request processing unit 70 may implement hypertext transfer protocol (HTTP) version 1.1, as described in RFC 2616, "Hypertext Transfer Protocol—HTTP/1.1," by R. Fielding et al, Network Working Group, IETF, June 1999. That is, request processing unit 70 may be configured to receive HTTP GET or partial GET requests and provide data of multimedia content 64 in response to the requests. The requests may specify a segment of one of representations 68, e.g., using a URL of the segment. In some examples, the requests may also specify one or more byte ranges of the segment, thus comprising partial GET requests. Request processing unit 70 may further be configured to service HTTP HEAD requests to provide header data of a segment of one of representations 68. In any case, request processing unit 70 may be configured to process the requests to provide requested data to a requesting device, such as client device 40.

Additionally or alternatively, request processing unit 70 may be configured to deliver media data via a broadcast or multicast protocol, such as eMBMS. Content preparation device 20 may create DASH segments and/or sub-segments in substantially the same way as described, but server device 60 may deliver these segments or sub-segments using eMBMS or another broadcast or multicast network transport protocol. For example, request processing unit 70 may be configured to receive a multicast group join request from client device 40. That is, server device 60 may advertise an Internet protocol (IP) address associated with a multicast group to client devices, including client device 40, associated with particular media content (e.g., a broadcast of a live event). Client device 40, in turn, may submit a request to join the multicast group. This request may be propagated throughout network 74, e.g., routers making up network 74, such that the routers are caused to direct traffic destined for the IP address associated with the multicast group to subscribing client devices, such as client device 40.

As illustrated in the example of FIG. 1, multimedia content 64 includes manifest file 66, which may correspond to a media presentation description (MPD). Manifest file 66 may contain descriptions of different alternative representations 68 (e.g., video services with different qualities) and the description may include, e.g., codec information, a profile value, a level value, a bitrate, and other descriptive characteristics of representations 68. Client device 40 may retrieve the MPD of a media presentation to determine how to access segments of representations 68.

In particular, retrieval unit 52 may retrieve configuration data (not shown) of client device 40 to determine decoding capabilities of video decoder 48 and rendering capabilities of video output 44. The configuration data may also include any or all of a language preference selected by a user of client device 40, one or more camera perspectives corresponding to depth preferences set by the user of client device 40, and/or a rating preference selected by the user of client device 40. Retrieval unit 52 may comprise, for example, a web browser or a media client configured to submit HTTP GET and partial GET requests. Retrieval unit 52 may correspond to software instructions executed by one or more processors or processing units (not shown) of client device 40. In some examples, all or portions of the functionality described with respect to retrieval unit 52 may be implemented in hardware, or a combination of hardware, software, and/or firmware, where requisite hardware may be provided to execute instructions for software or firmware.

Retrieval unit 52 may compare the decoding and rendering capabilities of client device 40 to characteristics of representations 68 indicated by information of manifest file 66. Retrieval unit 52 may initially retrieve at least a portion of manifest file 66 to determine characteristics of representations 68. For example, retrieval unit 52 may request a portion of manifest file 66 that describes characteristics of one or more adaptation sets. Retrieval unit 52 may select a subset of representations 68 (e.g., an adaptation set) having characteristics that can be satisfied by the coding and rendering capabilities of client device 40. Retrieval unit 52 may then determine bitrates for representations in the adaptation set, determine a currently available amount of network bandwidth, and retrieve segments from one of the representations having a bitrate that can be satisfied by the network bandwidth.

In general, higher bitrate representations may yield higher quality video playback, while lower bitrate representations may provide sufficient quality video playback when available network bandwidth decreases. Accordingly, when available network bandwidth is relatively high, retrieval unit 52 may retrieve data from relatively high bitrate representations, whereas when available network bandwidth is low, retrieval unit 52 may retrieve data from relatively low bitrate representations. In this manner, client device 40 may stream multimedia data over network 74 while also adapting to changing network bandwidth availability of network 74.

Additionally or alternatively, retrieval unit 52 may be configured to receive data in accordance with a broadcast or multicast network protocol, such as eMBMS or IP multicast. In such examples, retrieval unit 52 may submit a request to join a multicast network group associated with particular media content. After joining the multicast group, retrieval unit 52 may receive data of the multicast group without further requests issued to server device 60 or content preparation device 20. Retrieval unit 52 may submit a request to leave the multicast group when data of the multicast group is no longer needed, e.g., to stop playback or to change channels to a different multicast group.

Network interface 54 may receive and provide data of segments of a selected representation to retrieval unit 52, which may in turn provide the segments to decapsulation unit 50. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Video encoder 28, video decoder 48, audio encoder 26, audio decoder 46, encapsulation unit 30, retrieval unit 52, and decapsulation unit 50 each may be implemented as any of a variety of suitable processing circuitry, as applicable, such as one or more microprocessors, digital signal processors (DSPs), application specific integrated circuits (ASICs), field programmable gate arrays (FPGAs), discrete logic circuitry, software, hardware, firmware or any combinations thereof. Each of video encoder 28 and video decoder 48 may be included in one or more encoders or decoders, either of which may be integrated as part of a combined video encoder/decoder (CODEC). Likewise, each of audio encoder 26 and audio decoder 46 may be included in one or more encoders or decoders, either of which may be integrated as part of a combined CODEC. An apparatus including video encoder 28, video decoder 48, audio encoder 26, audio decoder 46, encapsulation unit 30, retrieval unit 52, and/or decapsulation unit 50 may comprise an integrated circuit, a microprocessor, and/or a wireless communication device, such as a cellular telephone.

Client device 40, server device 60, and/or content preparation device 20 may be configured to operate in accordance with the techniques of this disclosure. For purposes of example, this disclosure describes these techniques with respect to client device 40 and server device 60. However, it should be understood that content preparation device 20 may be configured to perform these techniques, instead of (or in addition to) server device 60.

Encapsulation unit 30 may form NAL units comprising a header that identifies a program to which the NAL unit belongs, as well as a payload, e.g., audio data, video data, or data that describes the transport or program stream to which the NAL unit corresponds. For example, in H.264/AVC, a NAL unit includes a 1-byte header and a payload of varying size. A NAL unit including video data in its payload may comprise various granularity levels of video data. For example, a NAL unit may comprise a block of video data, a plurality of blocks, a slice of video data, or an entire picture of video data. Encapsulation unit 30 may receive encoded video data from video encoder 28 in the form of PES packets of elementary streams. Encapsulation unit 30 may associate each elementary stream with a corresponding program.

Encapsulation unit 30 may also assemble access units from a plurality of NAL units. In general, an access unit may comprise one or more NAL units for representing a frame of video data, as well as audio data corresponding to the frame when such audio data is available. An access unit generally includes all NAL units for one output time instance, e.g., all audio and video data for one time instance. For example, if each view has a frame rate of 20 frames per second (fps), then each time instance may correspond to a time interval of 0.05 seconds. During this time interval, the specific frames for all views of the same access unit (the same time instance) may be rendered simultaneously. In one example, an access unit may comprise a coded picture in one time instance, which may be presented as a primary coded picture.

Accordingly, an access unit may comprise all audio and video frames of a common temporal instance, e.g., all views corresponding to time X. This disclosure also refers to an encoded picture of a particular view as a "view component." That is, a view component may comprise an encoded picture (or frame) for a particular view at a particular time. Accordingly, an access unit may be defined as comprising all view components of a common temporal instance. The decoding order of access units need not necessarily be the same as the output or display order.

A media presentation may include a media presentation description (MPD), which may contain descriptions of different alternative representations (e.g., video services with different qualities) and the description may include, e.g., codec information, a profile value, and a level value. An MPD is one example of a manifest file, such as manifest file 66. Client device 40 may retrieve the MPD of a media presentation to determine how to access movie fragments of various presentations. Movie fragments may be located in movie fragment boxes (moof boxes) of video files.

Manifest file 66 (which may comprise, for example, an MPD) may advertise availability of segments of representations 68. That is, the MPD may include information indicating the wall-clock time at which a first segment of one of representations 68 becomes available, as well as information indicating the durations of segments within representations 68. In this manner, retrieval unit 52 of client device 40 may determine when each segment is available, based on the starting time as well as the durations of the segments preceding a particular segment.

After encapsulation unit 30 has assembled NAL units and/or access units into a video file based on received data, encapsulation unit 30 passes the video file to output interface 32 for output. In some examples, encapsulation unit 30 may store the video file locally or send the video file to a remote server via output interface 32, rather than sending the video file directly to client device 40. Output interface 32 may comprise, for example, a transmitter, a transceiver, a device for writing data to a computer-readable medium such as, for example, an optical drive, a magnetic media drive (e.g., floppy drive), a universal serial bus (USB) port, a network interface, or other output interface. Output interface 32 outputs the video file to a computer-readable medium, such as, for example, a transmission signal, a magnetic medium, an optical medium, a memory, a flash drive, or other computer-readable medium.

Network interface 54 may receive a NAL unit or access unit via network 74 and provide the NAL unit or access unit to decapsulation unit 50, via retrieval unit 52. Decapsulation unit 50 may decapsulate elements of a video file into constituent PES streams, depacketize the PES streams to retrieve encoded data, and send the encoded data to either audio decoder 46 or video decoder 48, depending on whether the encoded data is part of an audio or video stream, e.g., as indicated by PES packet headers of the stream. Audio decoder 46 decodes encoded audio data and sends the decoded audio data to audio output 42, while video decoder 48 decodes encoded video data and sends the decoded video data, which may include a plurality of views of a stream, to video output 44.

Figure 2:
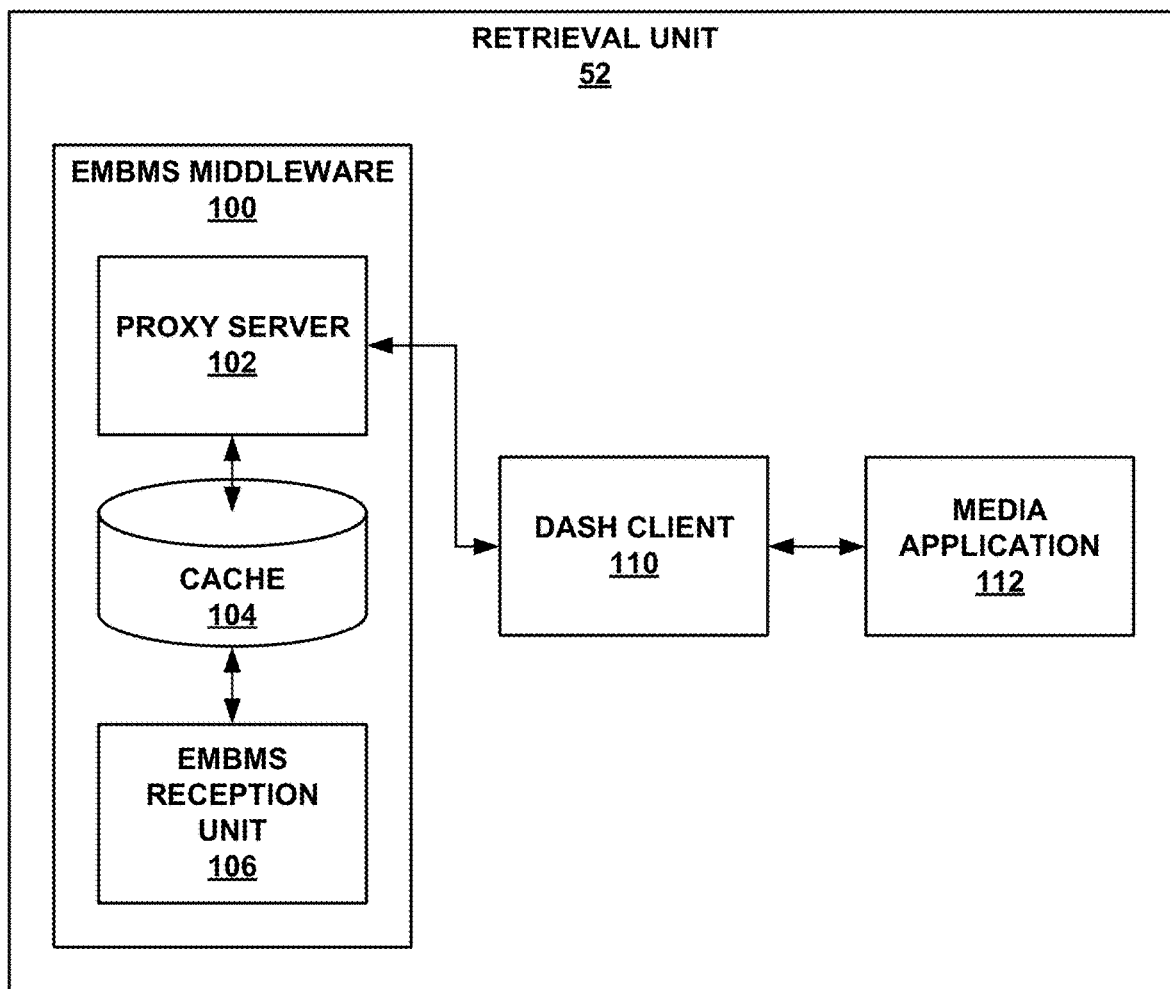
FIG. 2 is a block diagram illustrating an example set of components of the retrieval unit of FIG. 1.

FIG. 2 is a block diagram illustrating an example set of components of retrieval unit 52 of FIG. 1 in greater detail. In this example, retrieval unit 52 includes eMBMS middleware unit 100, DASH client 110, and media application 112.

In this example, eMBMS middleware unit 100 further includes eMBMS reception unit 106, cache 104, and proxy server unit 102. In this example, eMBMS reception unit 106 is configured to receive data via eMBMS, e.g., according to File Delivery over Unidirectional Transport (FLUTE), described in T. Paila et al., "FLUTE-File Delivery over Unidirectional Transport," Network Working Group, RFC 6726, November 2012, available at tools.ietf.org/html/rfc6726. That is, eMBMS reception unit 106 may receive files via broadcast from, e.g., server device 60, which may act as a broadcast/multicast service center (BM-SC).

As eMBMS middleware unit 100 receives data for files, eMBMS middleware unit may store the received data in cache 104. Cache 104 may comprise a computer-readable storage medium, such as flash memory, a hard disk, RAM, or any other suitable storage medium.

Proxy server unit 102 may act as a server for DASH client 110. For example, proxy server unit 102 may provide a MPD file or other manifest file to DASH client 110. Proxy server unit 102 may advertise availability times for segments in the MPD file, as well as hyperlinks from which the segments can be retrieved. These hyperlinks may include a localhost address prefix corresponding to client device 40 (e.g., 127.0.0.1 for IPv4). In this manner, DASH client 110 may request segments from proxy server unit 102 using HTTP GET or partial GET requests. For example, for a segment available from link http://127.0.0.1/rep1/seg3, DASH client 110 may construct an HTTP GET request that includes a request for http://127.0.0.1/rep1/seg3, and submit the request to proxy server unit 102. Proxy server unit 102 may retrieve requested data from cache 104 and provide the data to DASH client 110 in response to such requests.

Figure 3:
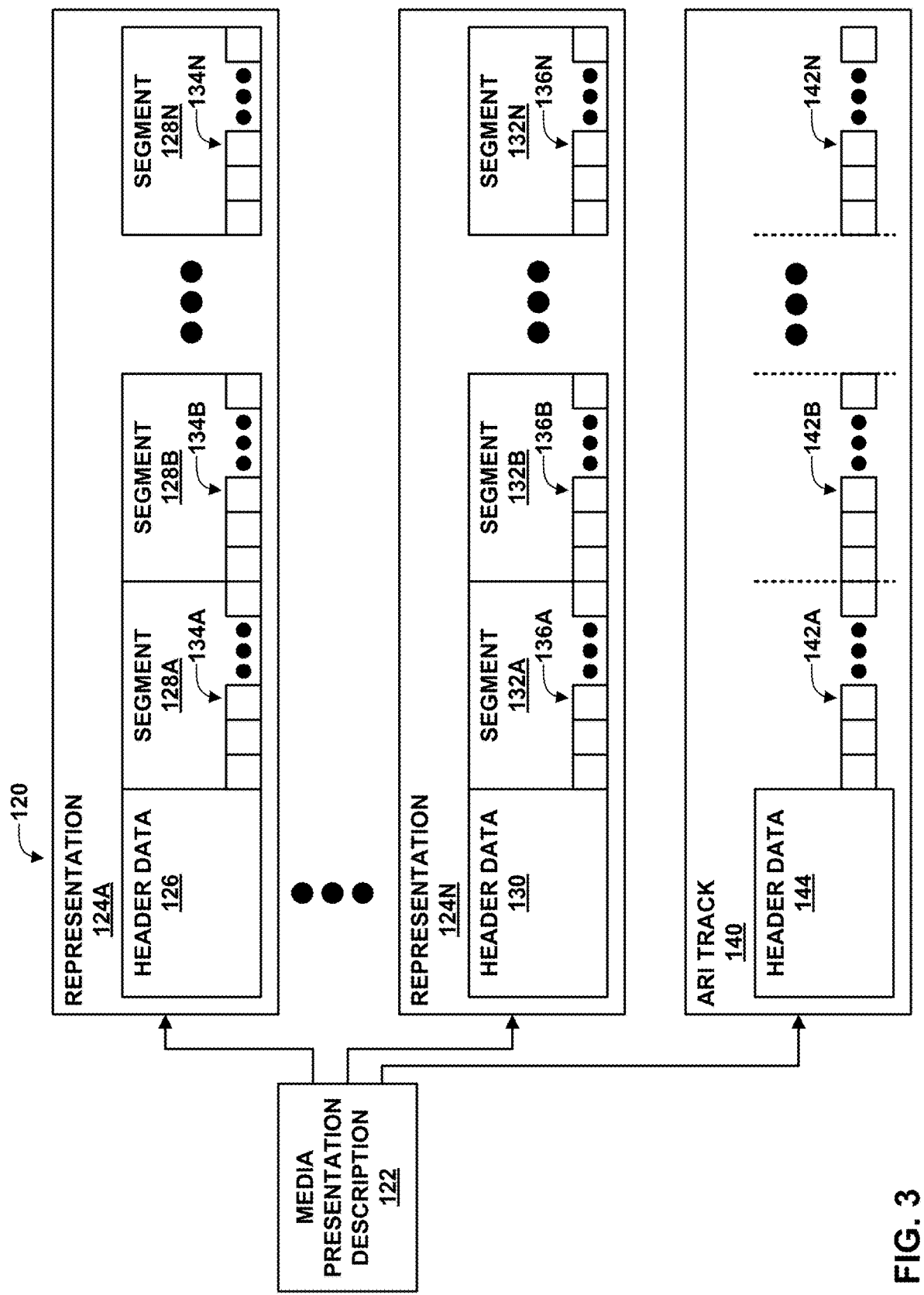
FIG. 3 is a conceptual diagram illustrating elements of example multimedia content.

FIG. 3 is a conceptual diagram illustrating elements of example multimedia content 120. Multimedia content 120 may correspond to multimedia content 64 (FIG. 1), or another multimedia content stored in storage medium 62. In the example of FIG. 3, multimedia content 120 includes media presentation description (MPD) 122, a plurality of representations 124A-124N (representations 124), and addressable resource information (ARI) track 140. Representation 124A includes optional header data 126 and segments 128A-128N (segments 128), while representation 124N includes optional header data 130 and segments 132A-132N (segments 132). The letter N is used to designate the last movie fragment in each of representations 124 as a matter of convenience. In some examples, there may be different numbers of movie fragments between representations 124.

MPD 122 may comprise a data structure separate from representations 124 and ARI track 140. MPD 122 may correspond to manifest file 66 of FIG. 1. Likewise, representations 124 may correspond to representations 68 of FIG. 1. In general, MPD 122 may include data that generally describes characteristics of representations 124, such as coding and rendering characteristics, adaptation sets, a profile to which MPD 122 corresponds, text type information, camera angle information, rating information, trick mode information (e.g., information indicative of representations that include temporal sub-sequences), and/or information for retrieving remote periods (e.g., for targeted advertisement insertion into media content during playback).

Header data 126, when present, may describe characteristics of segments 128, e.g., temporal locations of random access points (RAPs, also referred to as stream access points (SAPs)), which of segments 128 includes random access points, byte offsets to random access points within segments 128, uniform resource locators (URLs) of segments 128, or other aspects of segments 128. Header data 130, when present, may describe similar characteristics for segments 132. Additionally or alternatively, such characteristics may be fully included within MPD 122.

Segments 128, 132 include one or more coded video samples, each of which may include frames or slices of video data. Each of the coded video samples of segments 128 may have similar characteristics, e.g., height, width, and bandwidth requirements. Such characteristics may be described by data of MPD 122, though such data is not illustrated in the example of FIG. 3. MPD 122 may include characteristics as described by the 3GPP Specification, with the addition of any or all of the signaled information described in this disclosure.

Furthermore, in this example, each of segments 128, 132 includes independently retrievable chunks of media data. In particular, segments 128A-128N include respective chunks 134A-134N (chunks 134), and segments 132A-132N include respective chunks 136A-136N. In this example, segments 128, 132 are time aligned, such that boundaries of corresponding segments 128, 132 correspond to common playback times. Similarly, chunks 134, 136 are time aligned, such that boundaries of corresponding chunks 134, 136 correspond to common playback times. That is, the playback time at the boundary between segments 128A and 128B is the same as the playback time at the boundary between segments 132A and 132B. In this manner, switching between segments or chunks can be performed at segment/chunk boundaries.

Each of segments 128, 132 may be associated with a unique uniform resource locator (URL). Thus, each of segments 128, 132 may be independently retrievable using a streaming network protocol, such as DASH. In this manner, a destination device, such as client device 40, may use an HTTP GET request to retrieve segments 128 or 132. In some examples, client device 40 may use HTTP partial GET requests to retrieve specific byte ranges of segments 128 or 132.

ARI track 140 in this example includes header data 144 and samples 142A-142N (samples 142). Each of samples 142 corresponds to respective sets of chunks 134, 136. That is, ARI track 140 includes one of samples 142 that is time-aligned with each of time-aligned chunks 134, 136 of segments 128, 132, as shown in FIG. 3. Header data 144 may include data representing a number of tracks (i.e., a number of representations 124) included in a switching set described by ARI track 140, a switching set identifier representing the switching set described by ARI track 140, and a timescale identical to a timescale of the switching set, and may include additional information.

Each of samples 142 may include data for each of corresponding chunks 134, 136, such as a segment boundary flag indicating if the one of chunks 134, 136 begins a new segment (e.g., a new one of segments 128, 132), a track identifier (e.g., an identifier of a corresponding one of representations 124) for the chunk, and for each of the track identifiers: a marker signaling flag, a stream access point (SAP) type, an offset to a start of the corresponding segment, and a number of pairs for minbuffer/bandwidth predictions.

Figure 4:
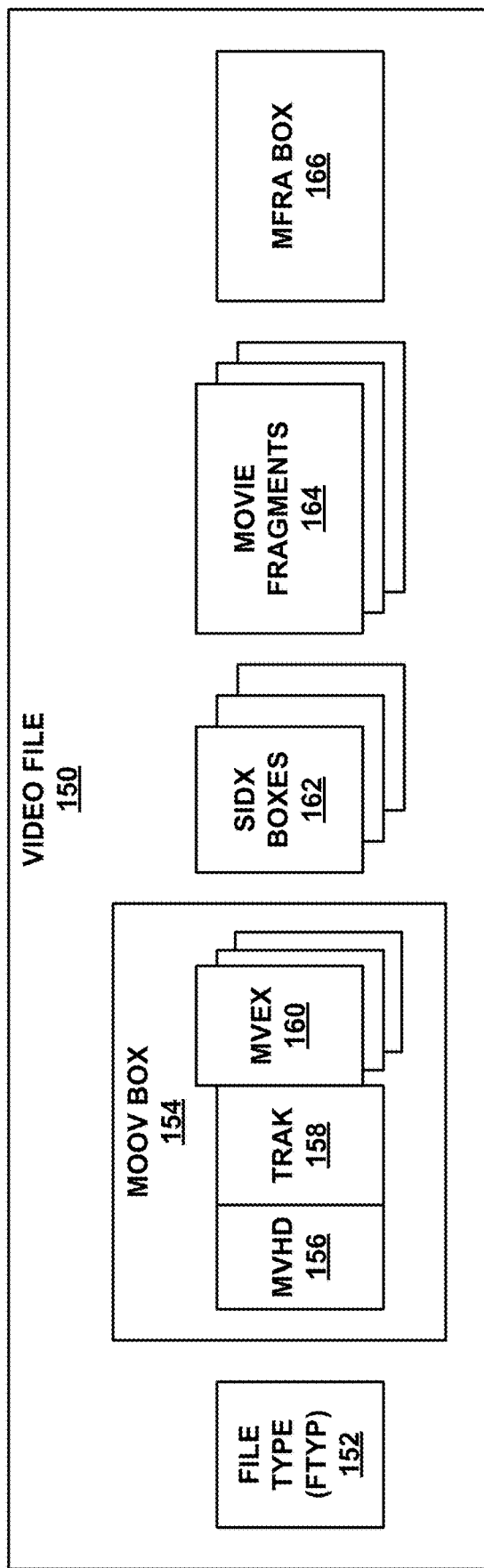
FIG. 4 is a block diagram illustrating elements of an example video file, which may correspond to a segment of a representation.

FIG. 4 is a block diagram illustrating elements of an example video file 150, which may correspond to a segment of a representation, such as one of segments 128, 132 of FIG. 3. Each of segments 128, 132 may include data that conforms substantially to the arrangement of data illustrated in the example of FIG. 4. Video file 150 may be said to encapsulate a segment. As described above, video files in accordance with the ISO base media file format and extensions thereof store data in a series of objects, referred to as "boxes." In the example of FIG. 4, video file 150 includes file type (FTYP) box 152, movie (MOOV) box 154, segment index (sidx) boxes 162, movie fragment (MOOF) boxes 164, and movie fragment random access (MFRA) box 166. Although FIG. 4 represents an example of a video file, it should be understood that other media files may include other types of media data (e.g., audio data, timed text data, or the like) that is structured similarly to the data of video file 150, in accordance with the ISO base media file format and its extensions.

File type (FTYP) box 152 generally describes a file type for video file 150. File type box 152 may include data that identifies a specification that describes a best use for video file 150. File type box 152 may alternatively be placed before MOOV box 154, movie fragment boxes 164, and/or MFRA box 166.

In some examples, a Segment, such as video file 150, may include an MPD update box (not shown) before FTYP box 152. The MPD update box may include information indicating that an MPD corresponding to a representation including video file 150 is to be updated, along with information for updating the MPD. For example, the MPD update box may provide a URI or URL for a resource to be used to update the MPD. As another example, the MPD update box may include data for updating the MPD. In some examples, the MPD update box may immediately follow a segment type (STYP) box (not shown) of video file 150, where the STYP box may define a segment type for video file 150.

MOOV box 154, in the example of FIG. 4, includes movie header (MVHD) box 156, track (TRAK) box 158, and one or more movie extends (MVEX) boxes 160. In general, MVHD box 156 may describe general characteristics of video file 150. For example, MVHD box 156 may include data that describes when video file 150 was originally created, when video file 150 was last modified, a timescale for video file 150, a duration of playback for video file 150, or other data that generally describes video file 150.

TRAK box 158 may include data for a track of video file 150. TRAK box 158 may include a track header (TKHD) box that describes characteristics of the track corresponding to TRAK box 158. In some examples, TRAK box 158 may include coded video pictures, while in other examples, the coded video pictures of the track may be included in movie fragments 164, which may be referenced by data of TRAK box 158 and/or sidx boxes 162.

In some examples, video file 150 may include more than one track. Accordingly, MOOV box 154 may include a number of TRAK boxes equal to the number of tracks in video file 150. TRAK box 158 may describe characteristics of a corresponding track of video file 150. For example, TRAK box 158 may describe temporal and/or spatial information for the corresponding track. A TRAK box similar to TRAK box 158 of MOOV box 154 may describe characteristics of a parameter set track, when encapsulation unit 30 (FIG. 3) includes a parameter set track in a video file, such as video file 150. Encapsulation unit 30 may signal the presence of sequence level SEI messages in the parameter set track within the TRAK box describing the parameter set track.

MVEX boxes 160 may describe characteristics of corresponding movie fragments 164, e.g., to signal that video file 150 includes movie fragments 164, in addition to video data included within MOOV box 154, if any. In the context of streaming video data, coded video pictures may be included in movie fragments 164 rather than in MOOV box 154. Accordingly, all coded video samples may be included in movie fragments 164, rather than in MOOV box 154.

MOOV box 154 may include a number of MVEX boxes 160 equal to the number of movie fragments 164 in video file 150. Each of MVEX boxes 160 may describe characteristics of a corresponding one of movie fragments 164. For example, each MVEX box may include a movie extends header box (MEHD) box that describes a temporal duration for the corresponding one of movie fragments 164.

As noted above, encapsulation unit 30 may store a sequence data set in a video sample that does not include actual coded video data. A video sample may generally correspond to an access unit, which is a representation of a coded picture at a specific time instance. In the context of AVC, the coded picture includes one or more VCL NAL units, which contain the information to construct all the pixels of the access unit and other associated non-VCL NAL units, such as SEI messages. Accordingly, encapsulation unit 30 may include a sequence data set, which may include sequence level SEI messages, in one of movie fragments 164. Encapsulation unit 30 may further signal the presence of a sequence data set and/or sequence level SEI messages as being present in one of movie fragments 164 within the one of MVEX boxes 160 corresponding to the one of movie fragments 164.

SIDX boxes 162 are optional elements of video file 150. That is, video files conforming to the 3GPP file format, or other such file formats, do not necessarily include SIDX boxes 162. In accordance with the example of the 3GPP file format, a SIDX box may be used to identify a sub-segment of a segment (e.g., a segment contained within video file 150). The 3GPP file format defines a sub-segment as "a self-contained set of one or more consecutive movie fragment boxes with corresponding Media Data box(es) and a Media Data Box containing data referenced by a Movie Fragment Box must follow that Movie Fragment box and precede the next Movie Fragment box containing information about the same track." The 3GPP file format also indicates that a SIDX box "contains a sequence of references to subsegments of the (sub)segment documented by the box. The referenced subsegments are contiguous in presentation time. Similarly, the bytes referred to by a Segment Index box are always contiguous within the segment. The referenced size gives the count of the number of bytes in the material referenced."

SIDX boxes 162 generally provide information representative of one or more sub-segments of a segment included in video file 150. For instance, such information may include playback times at which sub-segments begin and/or end, byte offsets for the sub-segments, whether the sub-segments include (e.g., start with) a stream access point (SAP), a type for the SAP (e.g., whether the SAP is an instantaneous decoder refresh (IDR) picture, a clean random access (CRA) picture, a broken link access (BLA) picture, or the like), a position of the SAP (in terms of playback time and/or byte offset) in the sub-segment, and the like.

Movie fragments 164 may include one or more coded video pictures. In some examples, movie fragments 164 may include one or more groups of pictures (GOPs), each of which may include a number of coded video pictures, e.g., frames or pictures. In addition, as described above, movie fragments 164 may include sequence data sets in some examples. Each of movie fragments 164 may include a movie fragment header box (MFHD, not shown in FIG. 4). The MFHD box may describe characteristics of the corresponding movie fragment, such as a sequence number for the movie fragment. Movie fragments 164 may be included in order of sequence number in video file 150.

MFRA box 166 may describe random access points within movie fragments 164 of video file 150. This may assist with performing trick modes, such as performing seeks to particular temporal locations (i.e., playback times) within a segment encapsulated by video file 150. MFRA box 166 is generally optional and need not be included in video files, in some examples. Likewise, a client device, such as client device 40, does not necessarily need to reference MFRA box 166 to correctly decode and display video data of video file 150. MFRA box 166 may include a number of track fragment random access (TFRA) boxes (not shown) equal to the number of tracks of video file 150, or in some examples, equal to the number of media tracks (e.g., non-hint tracks) of video file 150.

In some examples, movie fragments 164 may include one or more stream access points (SAPs), such as IDR pictures. Likewise, MFRA box 166 may provide indications of locations within video file 150 of the SAPs. Accordingly, a temporal sub-sequence of video file 150 may be formed from SAPs of video file 150. The temporal sub-sequence may also include other pictures, such as P-frames and/or B-frames that depend from SAPs. Frames and/or slices of the temporal sub-sequence may be arranged within the segments such that frames/slices of the temporal sub-sequence that depend on other frames/slices of the sub-sequence can be properly decoded. For example, in the hierarchical arrangement of data, data used for prediction for other data may also be included in the temporal sub-sequence.

Figure 5:
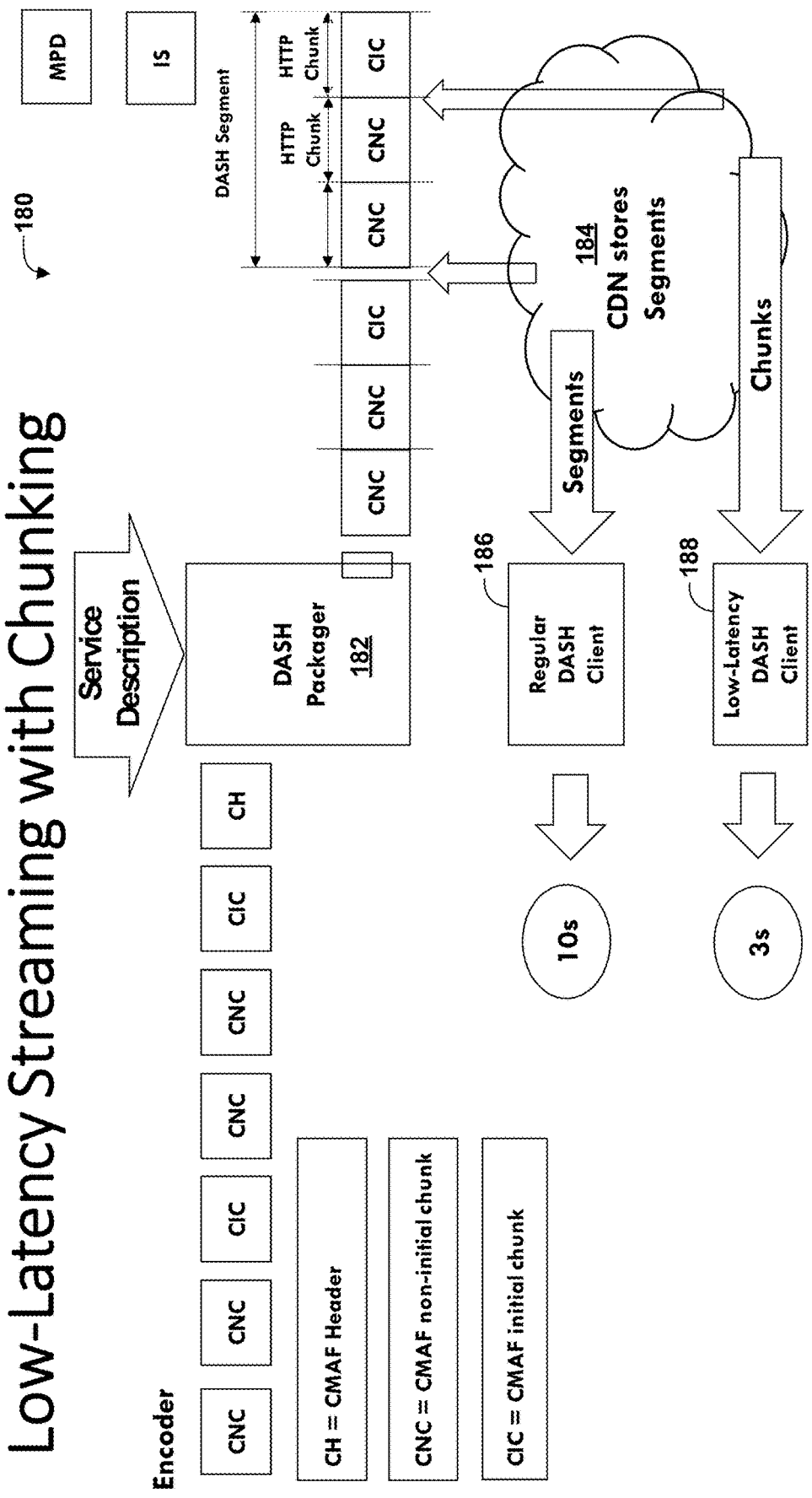
FIG. 5 is a conceptual diagram illustrating an example system for performing low latency streaming with chunking and using the addressable resource index (ARI) track according to the techniques of this disclosure.

FIG. 5 is a conceptual diagram illustrating an example system 180 for performing low latency streaming with chunking and using the addressable resource index (ARI) track according to the techniques of this disclosure. In this example, system 180 includes DASH packager 182, content delivery network (CDN) 184, regular DASH client 186, and low-latency DASH client 188. In this example, DASH packager 182 forms DASH segments and chunks from CMAF formatted media data. DASH packager 182 may correspond to content preparation device 20 or encapsulation unit 30 of FIG. 1.

Figure 6:
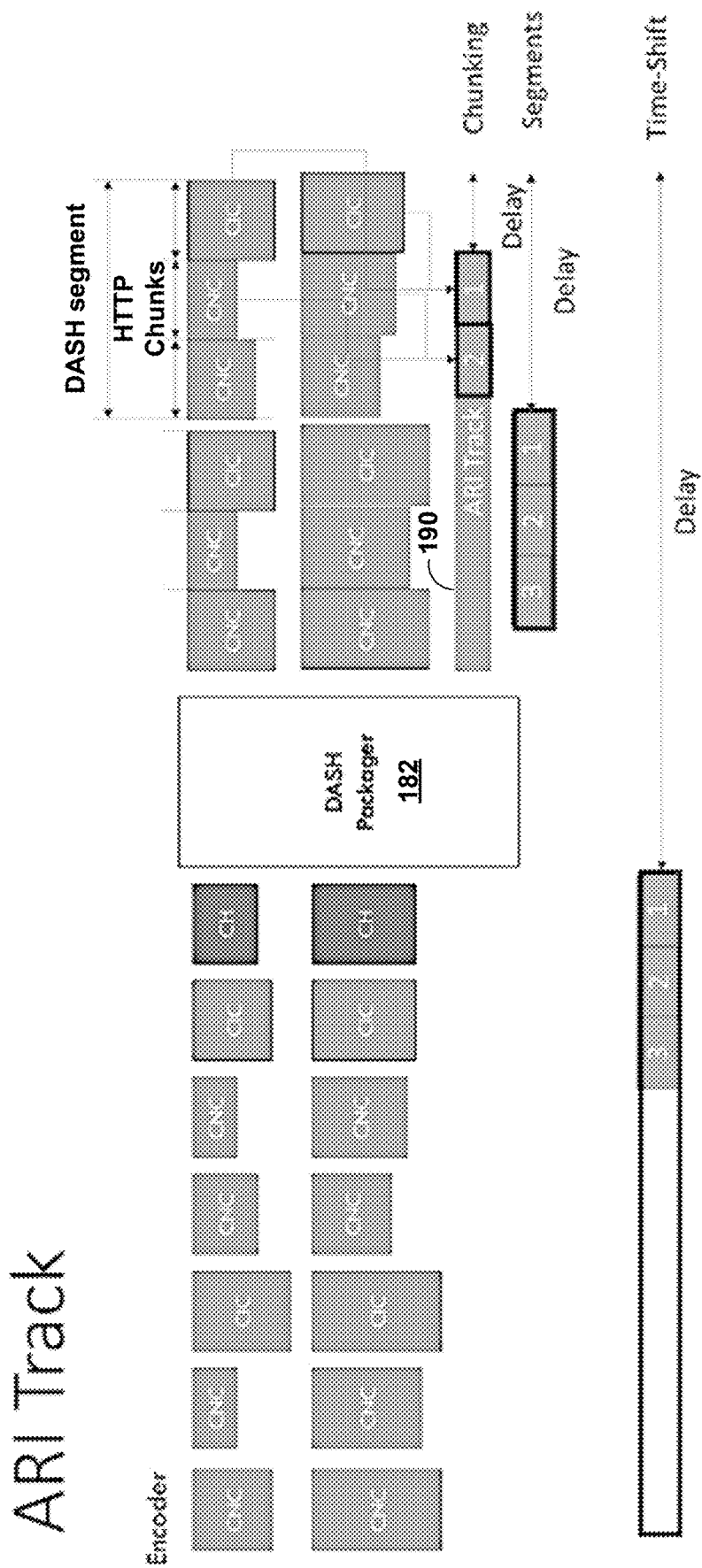
FIG. 6 is a conceptual diagram illustrating an example set of data including an ARI track according to the techniques of this disclosure.

DASH packager 182 can create all the metadata and add the metadata to stream an ARI Metadata track as shown in FIG. 6, discussed in greater detail below. Every set of chunks at the same media time (e.g., presentation time) results in a sample in the metadata track. One interesting aspect is that the publication delay of the metadata can be done in a flexible manner and is then a matter of regular streaming optimization aspects:
  More or less segments
  More or less requests
  More or less chunks
  Scalability
  And so on The information can also be used in exactly the same manner for live, on-demand, and time-shifted streaming operations. Content can be removed as well, based on a customized time-shift buffer.

FIG. 6 is a conceptual diagram illustrating an example set of data including an ARI track according to the techniques of this disclosure. FIG. 6 shows the basic concept that there is flexibility on how to design ARI Track 190 (chunked, segmented, or long segments). The tradeoffs are latency and delay for the live service that can use this information and the possible overhead.

Additional information may be added to the metadata track.

The information, if made available properly, can also not only be used by a DASH client, but may be made available to network nodes for example for:
  Resource allocation in a 5G Streaming context
  Prepopulating caches
  Etc.

This data may be used, for example in Fifth Generation (5G) media. The Media Session Handler and the 5GMSd AF coordinate the support for media streaming sessions, e.g. by allocating the necessary QoS for the PDU session and recommending available bitrate to the media player for appropriate adaptation.

Currently, the allocation of the QoS is performed rather in a static way, where information about the requirements of the session is read once from the Manifest file, e.g. the DASH MPD, and then shared with the Media Session Handler.

However, as discussed above, content is usually encoded in a capped VBR way, and the content undergoes large variations of the bitrate based on the complexity of the current scene.

In order to provide a more dynamic QoS allocation, the 5GMSd may receive the location of the CMAF Addressable Resource Index metadata and stream it to get current information about the actual and forecasted media bitrates and to adjust the QoS allocation, e.g., in coordination with the PCF or through the MSH sending bitrate recommendation queries to the RAN. For this purpose, the following information needs to be supplied by the player to the MSH and then the 5GMSd AF:
  URL to access the CMAF Addressable Resource Index metadata
  Current playback position in media timeline
  Current operation point, i.e., which Representations are being consumed That information is used by the Media Session Handler to perform RAN-based assistance and is also passed through the M5 to the 5GMSd AF.

The CMAF Addressable Resource Index metadata must be accessible by external applications, such as the MSH and the 5GMSd AF, without having an authorized media streaming session with authorization to access the actual content itself. Even without accessing the actual media segments, the index blocks may reveal information related to the content that might be of concern to the content provider and the user.

URL signing is applied by the player to authorize the MSH and the AF to get access to that metadata for the lifetime of that streaming session only. The access validation is performed by the content provider. The URL may contain a shared secret between the trusted player and the content provider, as well as other information such as the client_id or the IP address of the UE or 5GMSd that is allowed to get access to the metadata.

Figure 7:
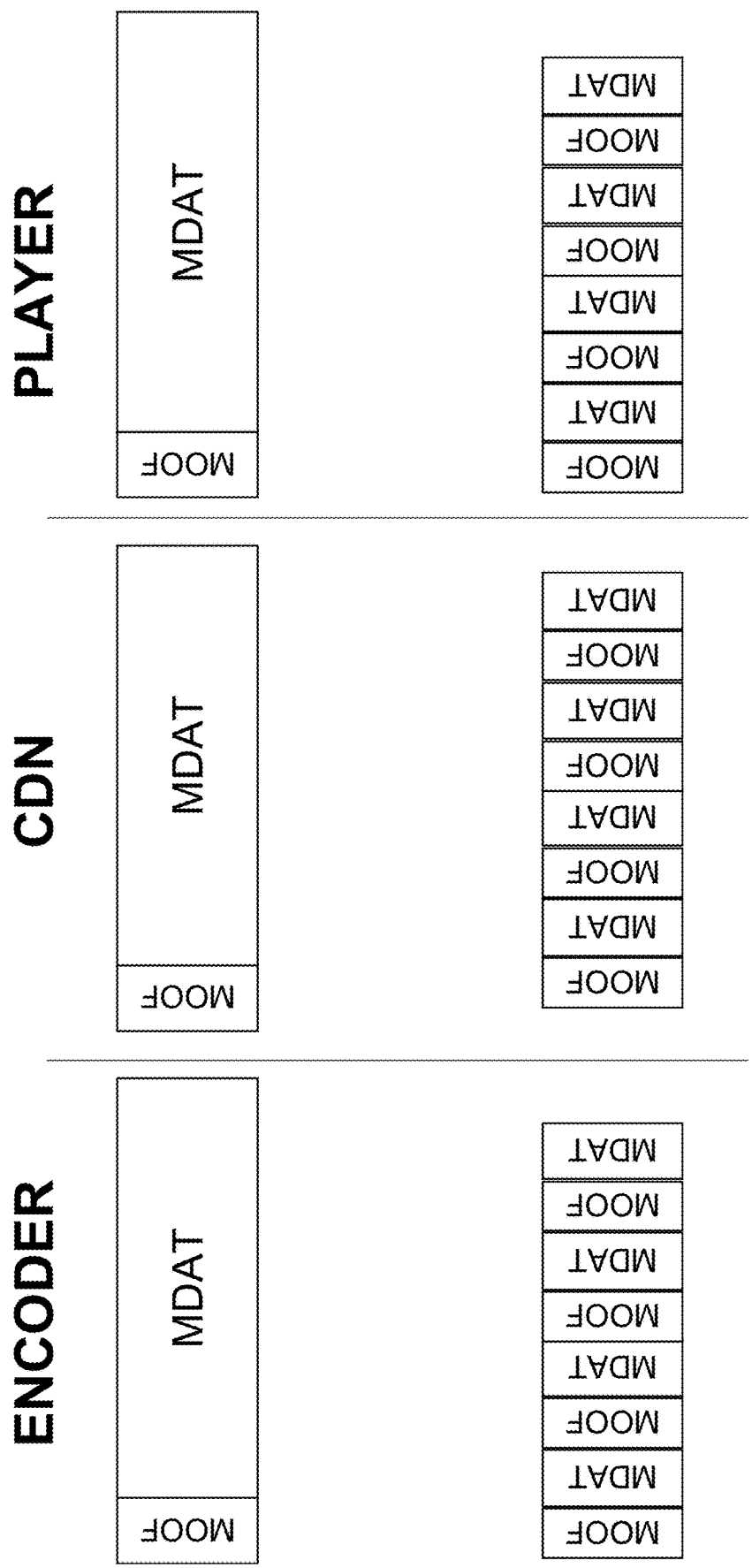
FIG. 7 is a conceptual diagram illustrating examples of boxes that may be included in Dynamic Adaptive Streaming over HTTP (DASH) segments and chunks.

FIG. 7 is a conceptual diagram illustrating examples of boxes that may be included in DASH segments and chunks. As shown in FIG. 7, DASH segments may include one MOOF box and one MDAT box. When segments are divided into chunks, each chunk may include both an MOOF box and an MDAT box.

Figure 8:
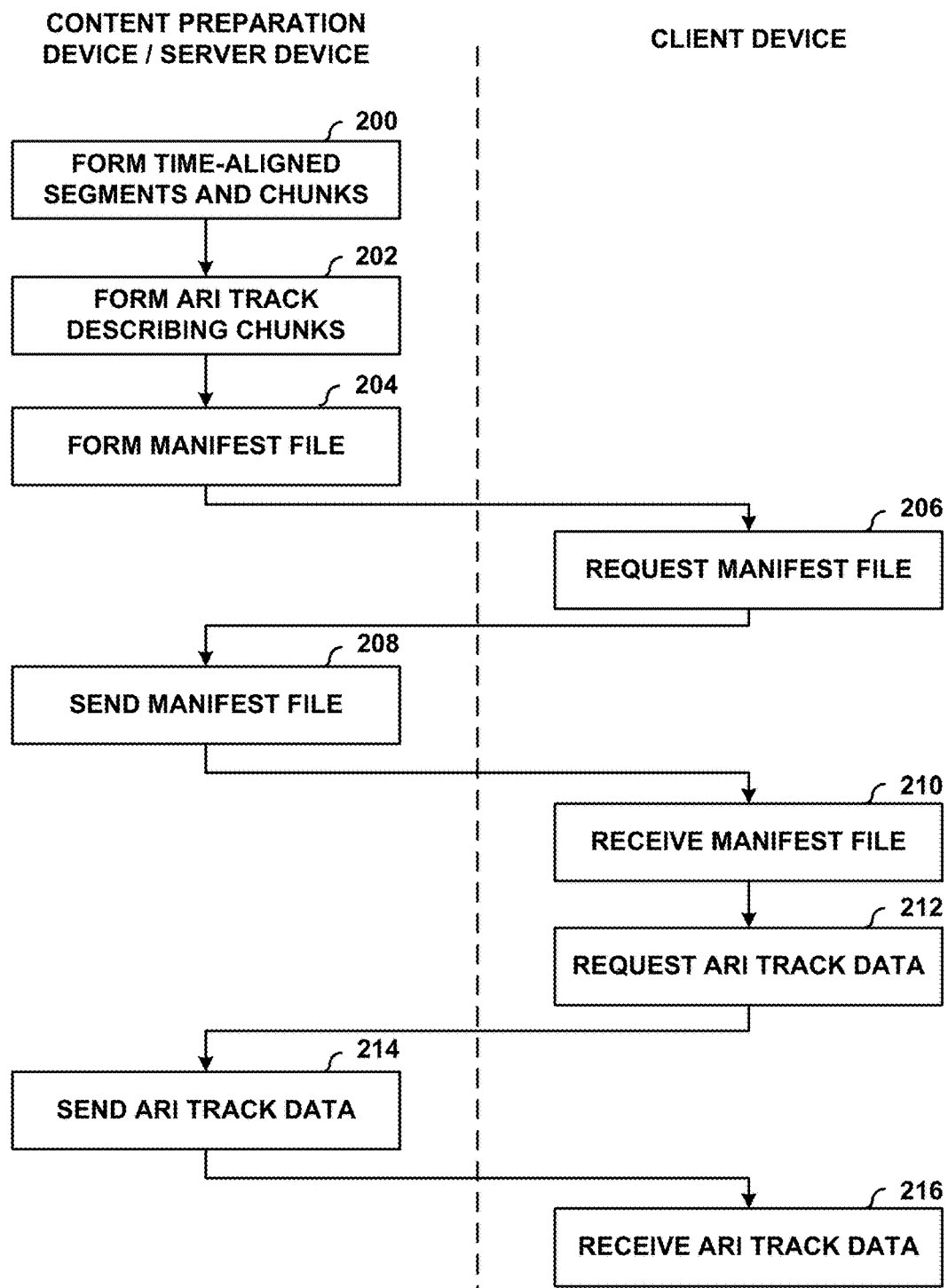
FIG. 8 is a flowchart illustrating an example method for providing an addressable resource information (ARI) track by a server device to a client device according to the techniques of this disclosure.

FIG. 8 is a flowchart illustrating an example method for providing an addressable resource information (ARI) track by a server device to a client device according to the techniques of this disclosure. The method of FIG. 8 may be performed by, e.g., content preparation device 20 and/or server device 60, and client device 40 of FIG. 1. As noted above, a single device may be configured to perform the functionality attributed to content preparation device 20 and server device 60.

Initially, content preparation device 20 may form time-aligned segments and chunks (200) of a media presentation. For example, content preparation device 20 may form the segments and chunks as shown in FIG. 3. That is, content preparation device 20 may form a plurality of representations, each including respective segments and chunks. Each of the representations may correspond to a media track of common media application format (CMAF) data. The various media tracks may form a switching set, such as a CMAF switching set. Content preparation device 20 may also form an ARI track describing the chunks (202) and a manifest file (204) describing the media presentation. In particular, the ARI track may be a single index track, which may be a single representation of an adaptation set. The manifest file may signal data for each of the representations and the ARI track. The manifest file may be a DASH media presentation description (MPD). Content preparation device 20 may provide the manifest file, ARI track, and media data to server device 60.

Client device 40 may send a request for the manifest file (206) to server device 60. Server device 60 may receive the request for the manifest file and, in response, send the manifest file to client device 40 (208). Client device 40 may then receive the manifest file (210). Client device 40 may process the manifest file to determine an address for the ARI track, then request ARI track data from server device 60 (212).

Server device 60 may receive the ARI track data request from client device 40, and in response, send the ARI track data to client device 40 (214). Client device 40 may then receive the requested ARI track data (216).

Figure 9:
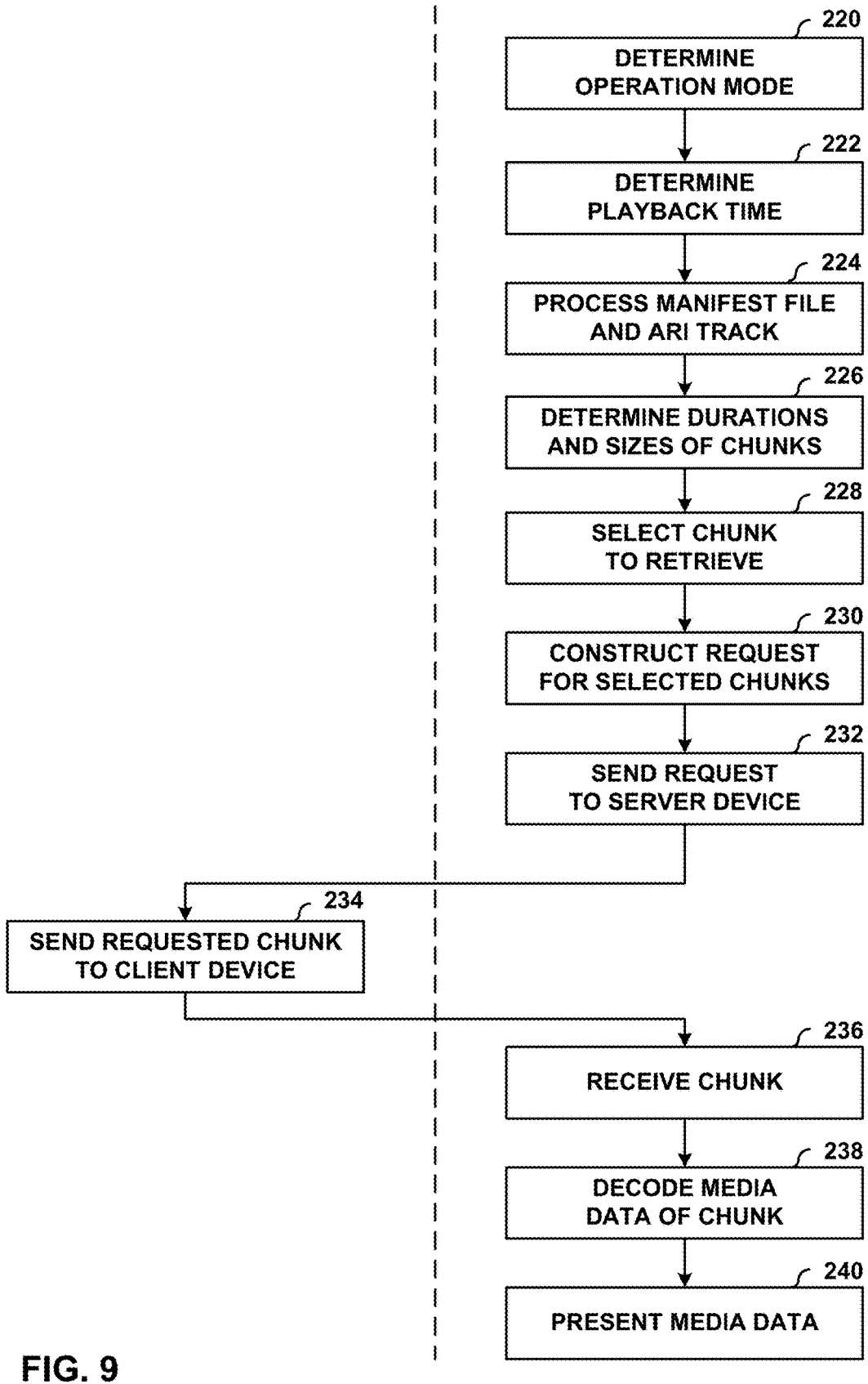
FIG. 9 is a flowchart illustrating an example method for using an addressable resource information (ARI) track to retrieve media data according to the techniques of this disclosure.

FIG. 9 is a flowchart illustrating an example method for using an addressable resource information (ARI) track to retrieve media data according to the techniques of this disclosure. The method of FIG. 9 may be performed by, e.g., content preparation device 20 and/or server device 60, and client device 40 of FIG. 1. As noted above, a single device may be configured to perform the functionality attributed to content preparation device 20 and server device 60. The method of FIG. 9 may be performed after performing the method of FIG. 8.

After having retrieved a manifest file (e.g., a DASH MPD) and an ARI track, client device 40 may determine an operation mode (220). The operation mode may be, for example, one of low-latency live, live, time-shifted, or video on demand (VoD). Additionally or alternatively, client device 40 may determine other stream characteristics, such as a target latency for media, network conditions, and/or a desired content quality. Client device 40 may also determine a playback time for which media data is to be retrieved (222).

Client device 40 may then process the manifest file and the ARI track (224), e.g., to determine characteristics of chunks corresponding to the playback time. For example, client device 40 may determine durations and sizes of each of the chunks (226) corresponding to the playback time from a sample of the ARI track corresponding to the playback time. Client device 40 may then select one of the chunks to retrieve for the playback time, based on the determined characteristics of the chunks and the operation mode and/or stream characteristics (228). For example, for the low latency live operation, client device 40 may prioritize small chunks with short durations, whereas for time-shifted or VoD operation modes, longer and/or larger chunks may be preferred.

Client device 40 may then construct a request for the selected chunk (230). For example, client device 40 may determine a byte range for the selected chunk from data of a sample of the ARI track corresponding to the chunk, and an adjacent sample of the ARI track. Each of the samples of the ARI track may indicate a byte offset to a beginning of a corresponding segment. Thus, client device 40 may determine a byte range from the byte offsets of the samples of the ARI track. Client device 40 may further determine a URL of the segment including the chunk from the manifest file. Thus, client device 40 may construct an HTTP partial GET request specifying the URL of the segment and the byte range determined from the byte offsets.

Client device 40 may then send the request to server device 60 (232). Server device 60 may receive the request and send the requested chunk to client device 40 (234). Client device 40 may receive the chunk (236), decode media data of the chunk (238), and present the media data (240).

In this manner, the methods of FIG. 8 and FIG. 9 jointly represents an example of a method including retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determining durations and sizes of the addressable resources from the data of the ARI track; determining one or more of the addressable resources to retrieve using the data of the ARI track including the durations and sizes of the addressable resources; and retrieving the determined addressable resources.

The following clauses describe various examples of the techniques of this disclosure.

Clause 1: A method of retrieving media data, the method comprising: retrieving data of an addressable resource information (ARI) track of media data, the data of the ARI track describing addressable resources and subsets of a Switching Set, and the ARI track being a single index track, the addressable resources comprising retrievable media data; and retrieving one or more of the addressable resources using the data of the ARI track.

Clause 2: The method of clause 1, wherein the Switching Set comprises a common media application format (CMAF) Switching Set.

Clause 3: The method of any of clauses 1 and 2, wherein the addressable resources comprise one or more of segments, fragments, or chunks.

Clause 4: The method of any of clauses 1-3, wherein the ARI track is time-aligned with the Switching Set.

Clause 5: The method of any of clauses 1-4, wherein the data of the ARI track includes properties of all tracks of the Switching Set.

Clause 6: The method of any of clauses 1-5, wherein the ARI track comprises header information, the method further comprising processing the header information of the ARI track.

Clause 7: The method of clause 6, wherein the header information comprises one or more of a number of tracks in the Switching Set, a Switching Set identifier value, or a timescale identical to a timescale of a track of the Switching Set.

Clause 8: The method of any of clauses 1-7, wherein the ARI track includes a sample for each chunk of the Switching Set in a time-aligned manner.

Clause 9: The method of any of clauses 1-8, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 10: The method of any of clauses 1-9, further comprising retrieving a manifest file for the media data, the manifest file including one or more of an indication that the ARI track is provided as an adaptation set with a single track or an indication of one or more of the Switching Sets associated with the ARI track.

Clause 11: The method of clause 10, wherein the manifest file comprises a media presentation description (MPD).

Clause 12: A device for retrieving media data, the device comprising one or more means for performing the method of any of clauses 1-11.

Clause 13: The device of clause 12, wherein the apparatus comprises at least one of: an integrated circuit; a microprocessor; or a wireless communication device.

Clause 14: A computer-readable storage medium having stored thereon instructions that, when executed, cause a processor to perform the method of any of clauses 1-11.

Clause 15: A device for retrieving media data, the device comprising: means for retrieving data of an addressable resource information (ARI) track of media data, the data of the ARI track describing addressable resources and subsets of a Switching Set, and the ARI track being a single index track, the addressable resources comprising retrievable media data; and means for retrieving one or more of the addressable resources using the data of the ARI track.

Clause 16: A method of retrieving media data, the method comprising: retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determining durations and sizes of the addressable resources from the data of the ARI track; determining one or more of the addressable resources to retrieve using the data of the ARI track including the durations and sizes of the addressable resources; and retrieving the determined addressable resources.

Clause 17: The method of clause 16, wherein the switching set comprises a common media application format (CMAF) switching set.

Clause 18: The method of clause 16, wherein each of the media tracks has a common segment, fragment, and chunk structure.

Clause 19: The method of clause 16, wherein the addressable resources comprise one or more of segments, fragments, or chunks.

Clause 20: The method of clause 16, wherein the ARI track is time-aligned with the switching set.

Clause 21: The method of clause 16, wherein the media tracks have a common chunk structure such that the media tracks each include playback-time-aligned chunks, and wherein the ARI track includes samples for each of the playback-time-aligned chunks.

Clause 22: The method of clause 21, wherein each of the samples of the ARI track describes the corresponding playback-time-aligned chunks of each of the media tracks.

Clause 23: The method of clause 22, wherein determining the one or more of the addressable resources to retrieve comprises: determining a playback time for which to retrieve an addressable resource of the one or more of the addressable resources; determining one of the samples of the ARI track corresponding to the playback time; determining the durations and sizes of the addressable resources of the playback-time-aligned chunks of each of the media tracks from the determined one of the samples of the ARI track; and determining at least one of the addressable resources to retrieve for the determined payback time according to the determined durations and sizes.

Clause 24: The method of clause 16, wherein determining the one or more of the addressable resources comprises determining the one or more of the addressable resources having durations and sizes that satisfy target durations and sizes according to an operation mode, the operation mode comprising one of low-latency live, live, time-shifted, or video on demand (VoD).

Clause 25: The method of clause 16, wherein the data of the ARI track includes properties of all tracks of the switching set.

Clause 26: The method of clause 16, wherein the ARI track comprises header information, the method further comprising processing the header information of the ARI track.

Clause 27: The method of clause 26, wherein the header information comprises one or more of a number of tracks in the switching set, a switching set identifier value, or a timescale identical to a timescale of a track of the switching set.

Clause 28: The method of clause 16, wherein the ARI track includes a sample for each chunk of the switching set in a time-aligned manner.

Clause 29: The method of clause 16, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 30: The method of clause 16, further comprising retrieving a manifest file for the media data, the manifest file including one or more of an indication that the ARI track is provided as an adaptation set with a single track or an indication of one or more of the switching sets associated with the ARI track.

Clause 31: The method of clause 30, wherein the manifest file comprises a media presentation description (MPD).

Clause 32: A device for retrieving media data, the device comprising: a memory configured to store media data; and one or more processors implemented in circuitry and configured to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; retrieve the determined addressable resources; and store the retrieved addressable resources in the memory.

Clause 33: The device of clause 32, wherein the switching set comprises a common media application format (CMAF) switching set.

Clause 34: The device of clause 32, wherein each of the media tracks has a common segment, fragment, and chunk structure.

Clause 35: The device of clause 32, wherein the addressable resources comprise one or more of segments, fragments, or chunks.

Clause 36: The device of clause 32, wherein the ARI track is time-aligned with the switching set.

Clause 37: The device of clause 32, wherein the media tracks have a common chunk structure such that the media tracks each include playback-time-aligned chunks, and wherein the ARI track includes samples for each of the playback-time-aligned chunks.

Clause 38: The device of clause 37, wherein each of the samples of the ARI track describes the corresponding playback-time-aligned chunks of each of the media tracks.

Clause 39: The device of clause 38, wherein to determine the one or more of the addressable resources to retrieve, the one or more processors are configured to: determine a playback time for which to retrieve an addressable resource of the one or more of the addressable resources; determine one of the samples of the ARI track corresponding to the playback time; determine the durations and sizes of the addressable resources of the playback-time-aligned chunks of each of the media tracks from the determined one of the samples of the ARI track; and determine at least one of the addressable resources to retrieve for the determined payback time according to the determined durations and sizes.

Clause 40: The device of clause 32, wherein the one or more processors are configured to determine the one or more of the addressable resources having durations and sizes that satisfy target durations and sizes according to an operation mode, the operation mode comprising one of low-latency live, live, time-shifted, or video on demand (VoD).

Clause 41: The device of clause 32, wherein the data of the ARI track includes properties of all tracks of the switching set.

Clause 42: The device of clause 32, wherein the ARI track comprises header information, and wherein the one or more processors are further configured to process the header information of the ARI track.

Clause 43: The device of clause 42, wherein the header information comprises one or more of a number of tracks in the switching set, a switching set identifier value, or a timescale identical to a timescale of a track of the switching set.

Clause 44: The device of clause 32, wherein the ARI track includes a sample for each chunk of the switching set in a time-aligned manner.

Clause 45: The device of clause 32, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 46: The device of clause 32, wherein the one or more processors are further configured to retrieve a manifest file for the media data, the manifest file including one or more of an indication that the ARI track is provided as an adaptation set with a single track or an indication of one or more of the switching sets associated with the ARI track.

Clause 47: The device of clause 46, wherein the manifest file comprises a media presentation description (MPD).

Clause 48: The device of clause 32, wherein the apparatus comprises at least one of: an integrated circuit; a microprocessor; or a wireless communication device.

Clause 49: A computer-readable storage medium having stored thereon instructions that, when executed, cause a processor to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; and retrieve the determined addressable resources.

Clause 50: The computer-readable storage medium of clause 49, wherein the switching set comprises a common media application format (CMAF) switching set.

Clause 51: The computer-readable storage medium of clause 49, wherein each of the media tracks has a common segment, fragment, and chunk structure.

Clause 52: The computer-readable storage medium of clause 49, wherein the addressable resources comprise one or more of segments, fragments, or chunks.

Clause 53: The computer-readable storage medium of clause 49, wherein the ARI track is time-aligned with the switching set.

Clause 54: The computer-readable storage medium of clause 49, wherein the media tracks have a common chunk structure such that the media tracks each include playback-time-aligned chunks, and wherein the ARI track includes samples for each of the playback-time-aligned chunks.

Clause 55: The computer-readable storage medium of clause 54, wherein each of the samples of the ARI track describes the corresponding playback-time-aligned chunks of each of the media tracks.

Clause 56: The computer-readable storage medium of clause 55, wherein the instructions that cause the processor to determine the one or more of the addressable resources to retrieve comprise instructions that cause the processor to: determine a playback time for which to retrieve an addressable resource of the one or more of the addressable resources; determine one of the samples of the ARI track corresponding to the playback time; determine the durations and sizes of the addressable resources of the playback-time-aligned chunks of each of the media tracks from the determined one of the samples of the ARI track; and determine at least one of the addressable resources to retrieve for the determined payback time according to the determined durations and sizes.

Clause 57: The computer-readable storage medium of clause 49, wherein the instructions that cause the processor to determine the one or more of the addressable resources comprises instructions that cause the processor to determine the one or more of the addressable resources having durations and sizes that satisfy target durations and sizes according to an operation mode, the operation mode comprising one of low-latency live, live, time-shifted, or video on demand (VoD).

Clause 58: The computer-readable storage medium of clause 49, wherein the data of the ARI track includes properties of all tracks of the switching set.

Clause 59: The computer-readable storage medium of clause 49, wherein the ARI track comprises header information, the method further comprising processing the header information of the ARI track.

Clause 60: The computer-readable storage medium of clause 59, wherein the header information comprises one or more of a number of tracks in the switching set, a switching set identifier value, or a timescale identical to a timescale of a track of the switching set.

Clause 61: The computer-readable storage medium of clause 49, wherein the ARI track includes a sample for each chunk of the switching set in a time-aligned manner.

Clause 62: The computer-readable storage medium of clause 49, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 63: The computer-readable storage medium of clause 49, further comprising instructions that cause the processor to retrieve a manifest file for the media data, the manifest file including one or more of an indication that the ARI track is provided as an adaptation set with a single track or an indication of one or more of the switching sets associated with the ARI track.

Clause 64: The computer-readable storage medium of clause 63, wherein the manifest file comprises a media presentation description (MPD).

Clause 65: A device for retrieving media data, the device comprising: means for retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; means for determining durations and sizes of the addressable resources from the data of the ARI track; means for determining one or more of the addressable resources to retrieve using the data of the ARI track including the durations and sizes of the addressable resources; and means for retrieving the determined addressable resources.

Clause 66: A method of retrieving media data, the method comprising: retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determining durations and sizes of the addressable resources from the data of the ARI track; determining one or more of the addressable resources to retrieve using the data of the ARI track including the durations and sizes of the addressable resources; and retrieving the determined addressable resources.

Clause 67: The method of clause 66, wherein the switching set comprises a common media application format (CMAF) switching set.

Clause 68: The method of any of clauses 66 and 67, wherein each of the media tracks has a common segment, fragment, and chunk structure.

Clause 69: The method of any of clauses 66-68, wherein the addressable resources comprise one or more of segments, fragments, or chunks.

Clause 70: The method of any of clauses 66-69, wherein the ARI track is time-aligned with the switching set.

Clause 71: The method of any of clauses 66-70, wherein the media tracks have a common chunk structure such that the media tracks each include playback-time-aligned chunks, and wherein the ARI track includes samples for each of the playback-time-aligned chunks.

Clause 72: The method of clause 71, wherein each of the samples of the ARI track describes the corresponding playback-time-aligned chunks of each of the media tracks.

Clause 73: The method of clause 72, wherein determining the one or more of the addressable resources to retrieve comprises: determining a playback time for which to retrieve an addressable resource of the one or more of the addressable resources; determining one of the samples of the ARI track corresponding to the playback time; determining the durations and sizes of the addressable resources of the playback-time-aligned chunks of each of the media tracks from the determined one of the samples of the ARI track; and determining at least one of the addressable resources to retrieve for the determined payback time according to the determined durations and sizes.

Clause 74: The method of any of clauses 66-73, wherein determining the one or more of the addressable resources comprises determining the one or more of the addressable resources having durations and sizes that satisfy target durations and sizes according to an operation mode, the operation mode comprising one of low-latency live, live, time-shifted, or video on demand (VoD).

Clause 75: The method of any of clauses 66-74, wherein the data of the ARI track includes properties of all tracks of the switching set.

Clause 76: The method of any of clauses 66-75, wherein the ARI track comprises header information, the method further comprising processing the header information of the ARI track.

Clause 77: The method of clause 76, wherein the header information comprises one or more of a number of tracks in the switching set, a switching set identifier value, or a timescale identical to a timescale of a track of the switching set.

Clause 78: The method of any of clauses 66-77, wherein the ARI track includes a sample for each chunk of the switching set in a time-aligned manner.

Clause 79: The method of any of clauses 66-78, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 80: The method of any of clauses 66-79, further comprising retrieving a manifest file for the media data, the manifest file including one or more of an indication that the ARI track is provided as an adaptation set with a single track or an indication of one or more of the switching sets associated with the ARI track.

Clause 81: The method of clause 80, wherein the manifest file comprises a media presentation description (MPD).

Clause 82: A device for retrieving media data, the device comprising: a memory configured to store media data; and one or more processors implemented in circuitry and configured to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; retrieve the determined addressable resources; and store the retrieved addressable resources in the memory.

Clause 83: The device of clause 82, wherein the switching set comprises a common media application format (CMAF) switching set.

Clause 84: The device of any of clauses 82 and 83, wherein each of the media tracks has a common segment, fragment, and chunk structure.

Clause 85: The device of any of clauses 82-84, wherein the addressable resources comprise one or more of segments, fragments, or chunks.

Clause 86: The device of any of clauses 82-85, wherein the ARI track is time-aligned with the switching set.

Clause 87: The device of any of clauses 82-86, wherein the media tracks have a common chunk structure such that the media tracks each include playback-time-aligned chunks, and wherein the ARI track includes samples for each of the playback-time-aligned chunks.

Clause 88: The device of clause 87, wherein each of the samples of the ARI track describes the corresponding playback-time-aligned chunks of each of the media tracks.

Clause 89: The device of clause 88, wherein to determine the one or more of the addressable resources to retrieve, the one or more processors are configured to: determine a playback time for which to retrieve an addressable resource of the one or more of the addressable resources; determine one of the samples of the ARI track corresponding to the playback time; determine the durations and sizes of the addressable resources of the playback-time-aligned chunks of each of the media tracks from the determined one of the samples of the ARI track; and determine at least one of the addressable resources to retrieve for the determined payback time according to the determined durations and sizes.

Clause 90: The device of any of clauses 82-89, wherein the one or more processors are configured to determine the one or more of the addressable resources having durations and sizes that satisfy target durations and sizes according to an operation mode, the operation mode comprising one of low-latency live, live, time-shifted, or video on demand (VoD).

Clause 91: The device of any of clauses 82-90, wherein the data of the ARI track includes properties of all tracks of the switching set.

Clause 92: The device of any of clauses 82-91, wherein the ARI track comprises header information, and wherein the one or more processors are further configured to process the header information of the ARI track.

Clause 93: The device of clause 92, wherein the header information comprises one or more of a number of tracks in the switching set, a switching set identifier value, or a timescale identical to a timescale of a track of the switching set.

Clause 94: The device of any of clauses 82-93, wherein the ARI track includes a sample for each chunk of the switching set in a time-aligned manner.

Clause 95: The device of any of clauses 82-94, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 96: The device of any of clauses 82-95, wherein the one or more processors are further configured to retrieve a manifest file for the media data, the manifest file including one or more of an indication that the ARI track is provided as an adaptation set with a single track or an indication of one or more of the switching sets associated with the ARI track.

Clause 97: The device of clause 96, wherein the manifest file comprises a media presentation description (MPD).

Clause 98: The device of any of clauses 82-97, wherein the apparatus comprises at least one of: an integrated circuit; a microprocessor; or a wireless communication device.

Clause 99: A computer-readable storage medium having stored thereon instructions that, when executed, cause a processor to: retrieve data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; determine durations and sizes of the addressable resources from the data of the ARI track; determine one or more of the addressable resources to retrieve using the data of the ARI track including the durations and sizes of the addressable resources; and retrieve the determined addressable resources.

Clause 100: The computer-readable storage medium of clause 99, wherein the switching set comprises a common media application format (CMAF) switching set.

Clause 101: The computer-readable storage medium of any of clauses 99 and 100, wherein each of the media tracks has a common segment, fragment, and chunk structure.

Clause 102: The computer-readable storage medium of any of clauses 99-101, wherein the addressable resources comprise one or more of segments, fragments, or chunks.

Clause 103: The computer-readable storage medium of any of clauses 99-102, wherein the ARI track is time-aligned with the switching set.

Clause 104: The computer-readable storage medium of any of clauses 99-103, wherein the media tracks have a common chunk structure such that the media tracks each include playback-time-aligned chunks, and wherein the ARI track includes samples for each of the playback-time-aligned chunks.

Clause 105: The computer-readable storage medium of clause 104, wherein each of the samples of the ARI track describes the corresponding playback-time-aligned chunks of each of the media tracks.

Clause 106: The computer-readable storage medium of clause 105, wherein the instructions that cause the processor to determine the one or more of the addressable resources to retrieve comprise instructions that cause the processor to: determine a playback time for which to retrieve an addressable resource of the one or more of the addressable resources; determine one of the samples of the ARI track corresponding to the playback time; determine the durations and sizes of the addressable resources of the playback-time-aligned chunks of each of the media tracks from the determined one of the samples of the ARI track; and determine at least one of the addressable resources to retrieve for the determined payback time according to the determined durations and sizes.

Clause 107: The computer-readable storage medium of any of clauses 99-106, wherein the instructions that cause the processor to determine the one or more of the addressable resources comprises instructions that cause the processor to determine the one or more of the addressable resources having durations and sizes that satisfy target durations and sizes according to an operation mode, the operation mode comprising one of low-latency live, live, time-shifted, or video on demand (VoD).

Clause 108: The computer-readable storage medium of any of clauses 99-107, wherein the data of the ARI track includes properties of all tracks of the switching set.

Clause 109: The computer-readable storage medium of any of clauses 99-108, wherein the ARI track comprises header information, the method further comprising processing the header information of the ARI track.

Clause 110: The computer-readable storage medium of clause 109, wherein the header information comprises one or more of a number of tracks in the switching set, a switching set identifier value, or a timescale identical to a timescale of a track of the switching set.

Clause 111: The computer-readable storage medium of any of clauses 99-110, wherein the ARI track includes a sample for each chunk of the switching set in a time-aligned manner.

Clause 112: The computer-readable storage medium of any of clauses 99-111, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

Clause 113: The computer-readable storage medium of any of clauses 99-112, further comprising instructions that cause the processor to retrieve a manifest file for the media data, the manifest file including one or more of an indication that the ARI track is provided as an adaptation set with a single track or an indication of one or more of the switching sets associated with the ARI track.

Clause 114: The computer-readable storage medium of clause 113, wherein the manifest file comprises a media presentation description (MPD).

Clause 115: A device for retrieving media data, the device comprising: means for retrieving data of an addressable resource information (ARI) track of a media presentation, the data of the ARI track describing addressable resources and subsets of a switching set of the media presentation, the switching set comprising a plurality of media tracks including the addressable resources, the ARI track being a single index track of the media presentation, the addressable resources comprising retrievable media data; means for determining durations and sizes of the addressable resources from the data of the ARI track; means for determining one or more of the addressable resources to retrieve using the data of the ARI track including the durations and sizes of the addressable resources; and means for retrieving the determined addressable resources.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code, and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A method of retrieving media data, the method comprising:
   retrieving data of an addressable resource information (ARI) track of a media presentation, the ARI track being separate from a manifest file for the media presentation, the ARI track being partitioned into samples, each sample describing corresponding addressable resources, the samples of the ARI track including data describing durations and sizes of the corresponding addressable resources, the ARI track further including data indicating subsets of a switching set of the media presentation, the switching set comprising a plurality of media tracks including the addressable resources, the plurality of media tracks being alternatives to each other and switchable between each other for bandwidth adaptation, each of the media tracks having a respective bitrate, the ARI track being a single track of the media presentation separate from the plurality of media tracks, the addressable resources comprising retrievable media data;
   determining the durations and the sizes of the addressable resources from the data of the corresponding samples of the ARI track;
   determining one or more of the addressable resources to retrieve using the data of the corresponding samples of the ARI track including the durations and the sizes of the addressable resources; and
   retrieving the determined addressable resources.

2. The method of claim 1, wherein the switching set comprises a common media application format (CMAF) switching set.

3. The method of claim 1, wherein each of the media tracks has a common segment, fragment, and chunk structure.

4. The method of claim 1, wherein the addressable resources comprise one or more of segments, fragments, or chunks.

5. The method of claim 1, wherein the samples of the ARI track are time-aligned with the corresponding addressable resources of the switching set.

6. The method of claim 1, wherein the media tracks have a common chunk structure such that the media tracks each include playback-time-aligned chunks, and wherein the ARI track includes the samples for each of the corresponding playback-time-aligned chunks.

7. The method of claim 6, wherein determining the one or more of the addressable resources to retrieve comprises:
   determining a playback time for which to retrieve an addressable resource of the one or more of the addressable resources;
   determining one of the samples of the ARI track corresponding to the playback time;
   determining the durations and the sizes of the addressable resources of the playback-time-aligned chunks of each of the media tracks from the determined one of the samples of the ARI track; and
   determining at least one of the addressable resources to retrieve for the determined playback time according to the determined durations and sizes.

8. The method of claim 1, wherein determining the one or more of the addressable resources comprises determining the one or more of the addressable resources having durations and sizes that satisfy target durations and sizes according to an operation mode, the operation mode comprising one of low-latency live, live, time-shifted, or video on demand (VoD).

9. The method of claim 1, wherein the data of the ARI track includes properties of all tracks of the switching set.

10. The method of claim 1, wherein the ARI track comprises header information, the method further comprising processing the header information of the ARI track.

11. The method of claim 10, wherein the header information comprises one or more of a number of tracks in the switching set, a switching set identifier value, or a timescale identical to a timescale of a track of the switching set.

12. The method of claim 1, wherein the ARI track includes a sample for each chunk of the switching set in a time-aligned manner.

13. The method of claim 1, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

14. The method of claim 1, further comprising retrieving the manifest file for the media data, the manifest file including one or more of an indication that the ARI track is provided as an adaptation set with a single track or an indication of one or more of the switching sets associated with the ARI track.

15. The method of claim 14, wherein the manifest file comprises a media presentation description (MPD).

16. A device for retrieving media data, the device comprising:
   a memory configured to store media data; and
   one or more processors implemented in circuitry and configured to:
      retrieve data of an addressable resource information (ARI) track of a media presentation, the ARI track being separate from a manifest file for the media presentation, the ARI track being partitioned into samples, each sample describing corresponding addressable resources, the samples of the ARI track including data describing durations and sizes of the corresponding addressable resources, the ARI track further including data indicating subsets of a switching set of the media presentation, the switching set comprising a plurality of media tracks including the addressable resources, the plurality of media tracks being alternatives to each other and switchable between each other for bandwidth adaptation, each of the media tracks having a respective bitrate, the ARI track being a single track of the media presentation separate from the plurality of media tracks, the addressable resources comprising retrievable media data;

determine the durations and the sizes of the addressable resources from the data of the corresponding samples of the ARI track;

determine one or more of the addressable resources to retrieve using the data of the corresponding samples of the ARI track including the durations and the sizes of the addressable resources;

retrieve the determined addressable resources; and store the retrieved addressable resources in the memory.

17. The device of claim 16, wherein the switching set comprises a common media application format (CMAF) switching set.

18. The device of claim 16, wherein each of the media tracks has a common segment, fragment, and chunk structure.

19. The device of claim 16, wherein the addressable resources comprise one or more of segments, fragments, or chunks.

20. The device of claim 16, wherein the samples of the ARI track are time-aligned with the corresponding addressable resources of the switching set.

21. The device of claim 16, wherein the media tracks have a common chunk structure such that the media tracks each include playback-time-aligned chunks, and wherein the ARI track includes the samples for each of the corresponding playback-time-aligned chunks.

22. The device of claim 21, wherein to determine the one or more of the addressable resources to retrieve, the one or more processors are configured to:

determine a playback time for which to retrieve an addressable resource of the one or more of the addressable resources;

determine one of the samples of the ARI track corresponding to the playback time;

determine the durations and the sizes of the addressable resources of the playback-time-aligned chunks of each of the media tracks from the determined one of the samples of the ARI track; and determine at least one of the addressable resources to retrieve for the determined playback time according to the determined durations and sizes.

23. The device of claim 16, wherein the one or more processors are configured to determine the one or more of the addressable resources having durations and sizes that satisfy target durations and sizes according to an operation mode, the operation mode comprising one of low-latency live, live, time-shifted, or video on demand (VoD).

24. The device of claim 16, wherein the data of the ARI track includes properties of all tracks of the switching set.

25. The device of claim 16, wherein the ARI track comprises header information, and wherein the one or more processors are further configured to process the header information of the ARI track.

26. The device of claim 25, wherein the header information comprises one or more of a number of tracks in the switching set, a switching set identifier value, or a timescale identical to a timescale of a track of the switching set.

27. The device of claim 16, wherein the ARI track includes a sample for each chunk of the switching set in a time-aligned manner.

28. The device of claim 16, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

29. The device of claim 16, wherein the one or more processors are further configured to retrieve the manifest file for the media data, the manifest file including one or more of an indication that the ARI track is provided as an adaptation set with a single track or an indication of one or more of the switching sets associated with the ARI track.

30. The device of claim 29, wherein the manifest file comprises a media presentation description (MPD).

31. The device of claim 16, wherein the apparatus comprises at least one of:

an integrated circuit;

a microprocessor; or a wireless communication device.

32. A non-transitory computer-readable storage medium having stored thereon instructions that, when executed, cause a processor to:

retrieve data of an addressable resource information (ARI) track of a media presentation, the ARI track being separate from a manifest file for the media presentation, the ARI track being partitioned into samples, each sample describing corresponding addressable resources, the samples of the ARI track including data describing durations and sizes of the corresponding addressable resources, the ARI track further including data indicating subsets of a switching set of the media presentation, the switching set comprising a plurality of media tracks including the addressable resources, the plurality of media tracks being alternatives to each other and switchable between each other for bandwidth adaptation, each of the media tracks having a respective bitrate, the ARI track being a single track of the media presentation separate from the plurality of media tracks, the addressable resources comprising retrievable media data;

determine the durations and the sizes of the addressable resources from the data of the corresponding samples of the ARI track;

determine one or more of the addressable resources to retrieve using the data of the corresponding samples of the ARI track including the durations and the sizes of the addressable resources; and retrieve the determined addressable resources.

33. The non-transitory computer-readable storage medium of claim 32, wherein the switching set comprises a common media application format (CMAF) switching set.

34. The non-transitory computer-readable storage medium of claim 32, wherein each of the media tracks has a common segment, fragment, and chunk structure.

35. The non-transitory computer-readable storage medium of claim 32, wherein the addressable resources comprise one or more of segments, fragments, or chunks.

36. The non-transitory computer-readable storage medium of claim 32, wherein the samples of the ARI track are time-aligned with the corresponding addressable resources of the switching set.

37. The non-transitory computer-readable storage medium of claim 32, wherein the media tracks have a common chunk structure such that the media tracks each include playback-time-aligned chunks, and wherein the ARI track includes the samples for each of the corresponding playback-time-aligned chunks.

38. The non-transitory computer-readable storage medium of claim 37, wherein the instructions that cause the processor to determine the one or more of the addressable resources to retrieve comprise instructions that cause the processor to:
determine a playback time for which to retrieve an addressable resource of the one or more of the addressable resources;
determine one of the samples of the ARI track corresponding to the playback time;
determine the durations and the sizes of the addressable resources of the playback-time-aligned chunks of each of the media tracks from the determined one of the samples of the ARI track; and
determine at least one of the addressable resources to retrieve for the determined playback time according to the determined durations and sizes.

39. The non-transitory computer-readable storage medium of claim 32, wherein the instructions that cause the processor to determine the one or more of the addressable resources comprises instructions that cause the processor to determine the one or more of the addressable resources having durations and sizes that satisfy target durations and sizes according to an operation mode, the operation mode comprising one of low-latency live, live, time-shifted, or video on demand (VoD).

40. The non-transitory computer-readable storage medium of claim 31, wherein the data of the ARI track includes properties of all tracks of the switching set.

41. The non-transitory computer-readable storage medium of claim 32, wherein the ARI track comprises header information, further comprising instructions that cause the processor to process the header information of the ARI track.

42. The non-transitory computer-readable storage medium of claim 41, wherein the header information comprises one or more of a number of tracks in the switching set, a switching set identifier value, or a timescale identical to a timescale of a track of the switching set.

43. The non-transitory computer-readable storage medium of claim 32, wherein the ARI track includes a sample for each chunk of the switching set in a time-aligned manner.

44. The non-transitory computer-readable storage medium of claim 32, wherein the data of the ARI track includes, for at least one of the addressable resources, one or more of an indication of whether the resource is a start of a segment, whether the resource starts with a stream access point, a type for the stream access point, an offset to the resource, a size of the resource, a quality of the resource, a number of prediction pairs signaled, or a set of one or more of the prediction pairs each comprising a window value and a bitrate value.

45. The non-transitory computer-readable storage medium of claim 32, further comprising instructions that cause the processor to retrieve the manifest file for the media data, the manifest file including one or more of an indication that the ARI track is provided as an adaptation set with a single track or an indication of one or more of the switching sets associated with the ARI track.

46. The non-transitory computer-readable storage medium of claim 45, wherein the manifest file comprises a media presentation description (MPD).

47. A device for retrieving media data, the device comprising:
means for retrieving data of an addressable resource information (ARI) track of a media presentation, the ARI track being separate from a manifest file for the media presentation, the ARI track being partitioned into samples, each sample describing corresponding addressable resources, the samples of the ARI track including data describing durations and sizes of the corresponding addressable resources, the ARI track further including data indicating subsets of a switching set of the media presentation, the switching set comprising a plurality of media tracks including the addressable resources, the plurality of media tracks being alternatives to each other and switchable between each other for bandwidth adaptation, each of the media tracks having a respective bitrate, the ARI track being a single track of the media presentation separate from the plurality of media tracks, the addressable resources comprising retrievable media data;
means for determining the durations and the sizes of the addressable resources from the data of the ARI track;
means for determining one or more of the addressable resources to retrieve using the data of the ARI track including the durations and the sizes of the addressable resources; and
means for retrieving the determined addressable resources.

\* \* \* \* \*